US012694379B1

(12) United States Patent
Carlin

(10) Patent No.: US 12,694,379 B1
(45) Date of Patent: Jul. 28, 2026

(54) LATE BINDING ASSET FUNDING DATASTRUCTURE AND ROUTER APPARATUSES, PROCESSES AND SYSTEMS

(71) Applicant: Zelis Payments, LLC, Clearwater, FL (US)

(72) Inventor: Eileen Carlin, St. Petersburg, FL (US)

(73) Assignee: Zelis Payments, LLC, Clearwater, FL (US)

( * ) Notice: Subject to any disclaimer, the term of this patent is extended or adjusted under 35 U.S.C. 154(b) by 0 days.

(21) Appl. No.: 17/948,189

(22) Filed: Sep. 19, 2022

Related U.S. Application Data

(60) Provisional application No. 63/245,931, filed on Sep. 20, 2021.

(51) Int. Cl.
G06Q 20/24 (2012.01)
G06Q 20/02 (2012.01)

(52) U.S. Cl.
CPC ........... G06Q 20/023 (2013.01); G06Q 20/24 (2013.01)

(58) Field of Classification Search
None
See application file for complete search history.

(56) References Cited

U.S. PATENT DOCUMENTS

| | | | | | |
|---|---|---|---|---|---|
| 6,012,035 | A | * | 1/2000 | Freeman, Jr. ........ | G06Q 20/105 |
| | | | | | 705/40 |
| 7,184,989 | B2 | * | 2/2007 | Hansen ................ | G06Q 20/401 |
| | | | | | 705/45 |
| 10,043,160 | B2 | * | 8/2018 | Murphy ............... | G06Q 20/023 |
| 10,311,412 | B1 | * | 6/2019 | Josephs ................. | G06Q 20/24 |
| 11,436,304 | B1 | * | 9/2022 | Birgenheier ........... | G16H 40/20 |
| 2007/0185743 | A1 | * | 8/2007 | Jinks ...................... | G06Q 40/08 |
| | | | | | 705/4 |
| 2008/0010098 | A1 | * | 1/2008 | Willis .................... | G06Q 10/10 |
| | | | | | 705/4 |
| 2008/0021827 | A1 | * | 1/2008 | Willis .................. | G06Q 20/105 |
| | | | | | 705/41 |

(Continued)

*Primary Examiner* — William J Jacob
(74) *Attorney, Agent, or Firm* — Hanchuk Kheit LLP .; Walter G. Hanchuk

(57) ABSTRACT

The Late Binding Asset Funding Datastructure and Router Apparatuses, Processes and Systems ("LBAFDR") transforms print check, payment instructions, documents, virtual card import, payment inputs via LBAFDR components into ACH instructions, post-presentment funding disbursement outputs. The LBAFDR includes fund-later-delegate router apparatus, comprising, at least one memory, a component collection stored in the at least one memory, at least one processor disposed in communication with the at least one memory, the at least one processor executing processor-executable instructions from the component collection, the component collection storage structured with processor-executable instructions. The LBAFDR may include instructions to import, via the at least one processor, a variable payment datastructure, create a variable payment datastructure record, and provide a payment type information datastructure to a target facilitator. It also may obtain funding information datastructure from target facilitator, and provide credit back to variable payment datastructure record based on the obtained funding information datastructure.

12 Claims, 19 Drawing Sheets

LBAFDR---user interface screenshots

Settlement Proposal

(56) References Cited

U.S. PATENT DOCUMENTS

| | | | | |
|---|---|---|---|---|
| 2008/0077438 A1* | 3/2008 | Yanak | .................. | G06Q 20/108 |
| | | | | 705/2 |
| 2008/0086420 A1* | 4/2008 | Gilder | .................... | G06Q 20/04 |
| | | | | 705/35 |
| 2008/0091528 A1* | 4/2008 | Rampell | ............ | G06Q 30/0633 |
| | | | | 705/14.1 |
| 2010/0161466 A1* | 6/2010 | Gilder | .................... | G06Q 40/12 |
| | | | | 705/40 |
| 2012/0185395 A1* | 7/2012 | Wilkes | .................. | G06Q 20/14 |
| | | | | 705/44 |
| 2013/0073309 A1* | 3/2013 | Ritchie | ................. | G06Q 40/00 |
| | | | | 705/2 |
| 2015/0046292 A1* | 2/2015 | Zamer | ............... | G06Q 30/0629 |
| | | | | 705/26.64 |
| 2018/0018438 A1* | 1/2018 | Mahaffey | ............... | G06Q 40/03 |
| 2020/0402049 A1* | 12/2020 | Pi Farias | ............. | G06Q 20/208 |

* cited by examiner

LBAFDR---user interface screenshots

First Name *

Last Name *

Your Phone Number *

888-888-8888

Date of Birth *

[31]

Type of Advocacy Request *

Select ▷

Provider or Hospital Name *

Provider Phone Number *

Description of Advocacy Request *
Enter as much of information as you can to help the team understand your need.

☐ Send me a copy of my responses

Privacy Notice | Report Abuse

Submit ePayment Transmittal zelis.
payments

18167 US Hwy 19 N, Ste 300
Clearwater, FL 33764

Doctor Name

123 West Street
Houston, TX 77005

PT: Firstname Lastname   PT. DOB: not provided
MBR: Firstname Lastname   PLAN ID:

MATCH TO
PAYMENT ID:

Payment Date: 10/04/2017

Claim Payor:

Payer Name

123 West Street                    Electronic Claims:
Houston, TX 77005                  AAAAAAA Customer Service: 666-777-7777

Claim Questions? Please refer to the Payor's Customer
Service Phone Number as noted ABOVE.

Provider's TIN: 999999999

PT.
ACCT: 9999999999    GRP:
CLAIM #:            GRP #:

| Date of Service | Procedure | Billed Amount | PPO Discount | Non Covered | Other Coverage | Co-Pays | Deductible | Patient Resp. | Patient Paid | Ref. |
|---|---|---|---|---|---|---|---|---|---|---|
| | 99213: OFFICE VISIT | $1500 | $729 | $717 | $0 | $0 | $0 | $0 | $717 | |
| Totals: | | $1500 | $729 | $717 | $0 | $0 | $0 | $0 | $717 | |

Reference: FB: 182114342  Balance was paid pre-service as per agreement. Refer to pre-estimate
                          number 182114342

Total Paid By Payor

Total: $0

For questions regarding the claim or benefit determination, please contact the Payor
indicated in the box at the upper right hand corner of this EOP.

This ePayment was issued as a virtual credit card from the patient

*Fig. 1*

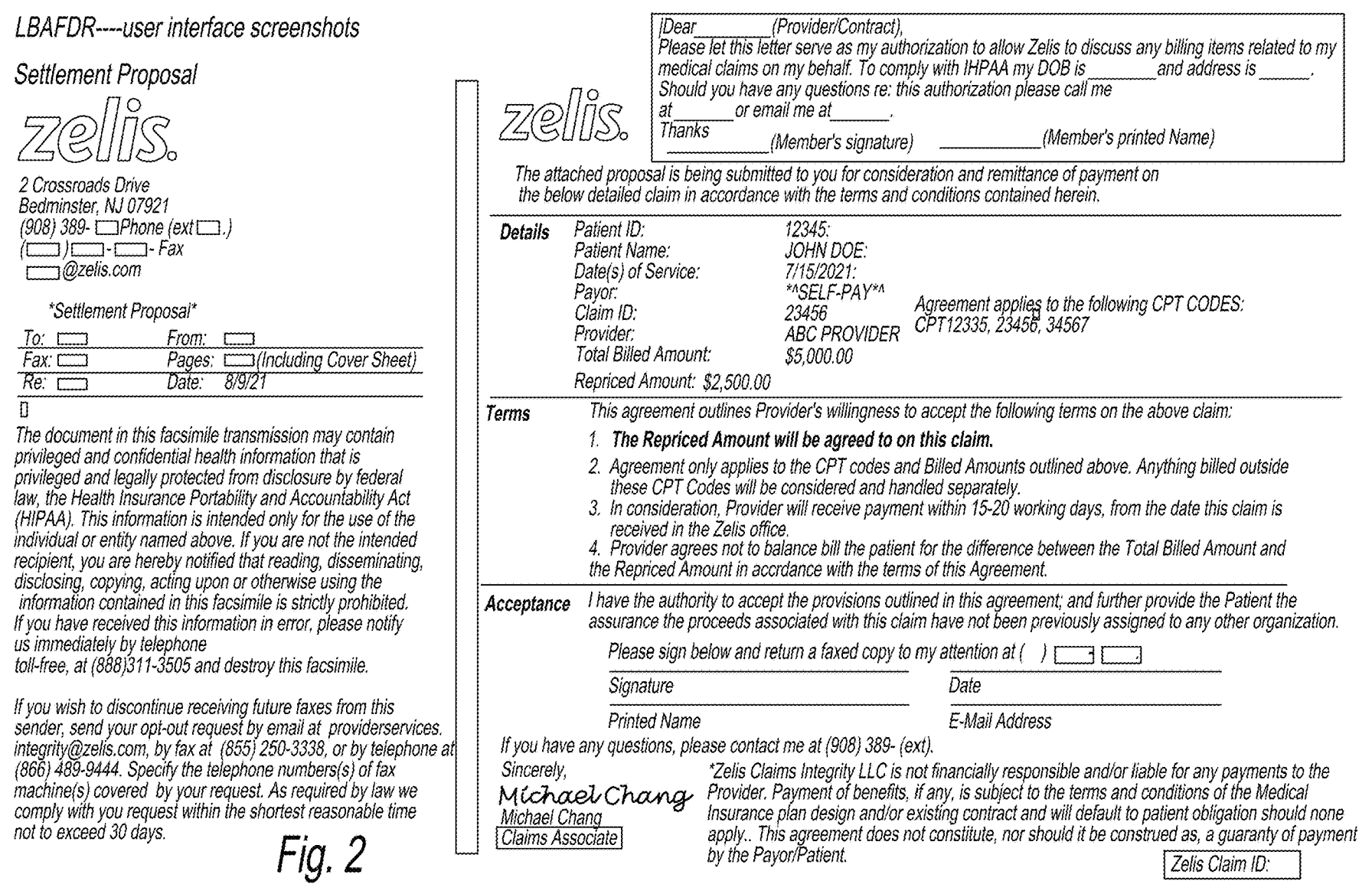

LBAFDR—user interface screenshots

Settlement Proposal zelis.

2 Crossroads Drive
Bedminster, NJ 07921

(908) 389- ☐ Phone (ext ☐ )
☐ ) ☐ - ☐ Fax
☐ @zelis.com

*Settlement Proposal*

To: ☐          From: ☐
Fax: ☐          Pages: ☐ (Including Cover Sheet)
Re: ☐          Date: 8/9/21
☐

The document in this facsimile transmission may contain privileged and confidential health information that is privileged and legally protected from disclosure by federal law, the Health Insurance Portability and Accountability Act (HIPAA). This information is intended only for the use of the individual or entity named above. If you are not the intended recipient, you are hereby notified that reading, disseminating, disclosing, copying, acting upon or otherwise using the information contained in this facsimile is strictly prohibited. If you have received this information in error, please notify us immediately by telephone toll-free, at (888)311-3505 and destroy this facsimile.

If you wish to discontinue receiving future faxes from this sender, send your opt-out request by email at providerservices. integrity@zelis.com, by fax at (855) 250-3338, or by telephone at (866) 489-9444. Specify the telephone numbers(s) of fax machine(s) covered by your request. As required by law we comply with you request within the shortest reasonable time not to exceed 30 days.

*Fig. 2*

[Dear _____ (Provider/Contract),
Please let this letter serve as my authorization to allow Zelis to discuss any billing items related to my medical claims on my behalf. To comply with IHPAA my DOB is _____ and address is _____. Should you have any questions re: this authorization please call me at _____ or email me at _____.
Thanks
_____ (Member's signature)          _____ (Member's printed Name)

The attached proposal is being submitted to you for consideration and remittance of payment on the below detailed claim in accordance with the terms and conditions contained herein.

Details
Patient ID:            12345:
Patient Name:          JOHN DOE:
Date(s) of Service:    7/15/2021:
Payor:                 SELF-PAY^A
Claim ID:              23456
Provider:              ABC PROVIDER
Total Billed Amount:   $5,000.00    Agreement applies to the following CPT CODES:
Repriced Amount: $2,500.00          CPT12335, 23456, 34567

Terms  This agreement outlines Provider's willingness to accept the following terms on the above claim:

1. The Repriced Amount will be agreed to on this claim.
2. Agreement only applies to the CPT codes and Billed Amounts outlined above. Anything billed outside these CPT Codes will be considered and handled separately.
3. In consideration, Provider will receive payment within 15-20 working days, from the date this claim is received in the Zelis office.
4. Provider agrees not to balance bill the patient for the difference between the Total Billed Amount and the Repriced Amount in accordance with the terms of this Agreement.

Acceptance  I have the authority to accept the provisions outlined in this agreement; and further provide the Patient the assurance the proceeds associated with this claim have not been previously assigned to any other organization.

Please sign below and return a faxed copy to my attention at ( ) ☐ - ☐
_____ Signature                    _____ Date
_____ Printed Name                 _____ E-Mail Address If you have any questions, please contact me at (908) 389- (ext).
Sincerely,
Michael Chang
Michael Chang
Claims Associate

*Zelis Claims Integrity LLC is not financially responsible and/or liable for any payments to the Provider. Payment of benefits, if any, is subject to the terms and conditions of the Medical Insurance plan design and/or existing contract and will default to patient obligation should none apply.. This agreement does not constitute, nor should it be construed as, a guaranty of payment by the Payor/Patient.

Zelis Claim ID: ]

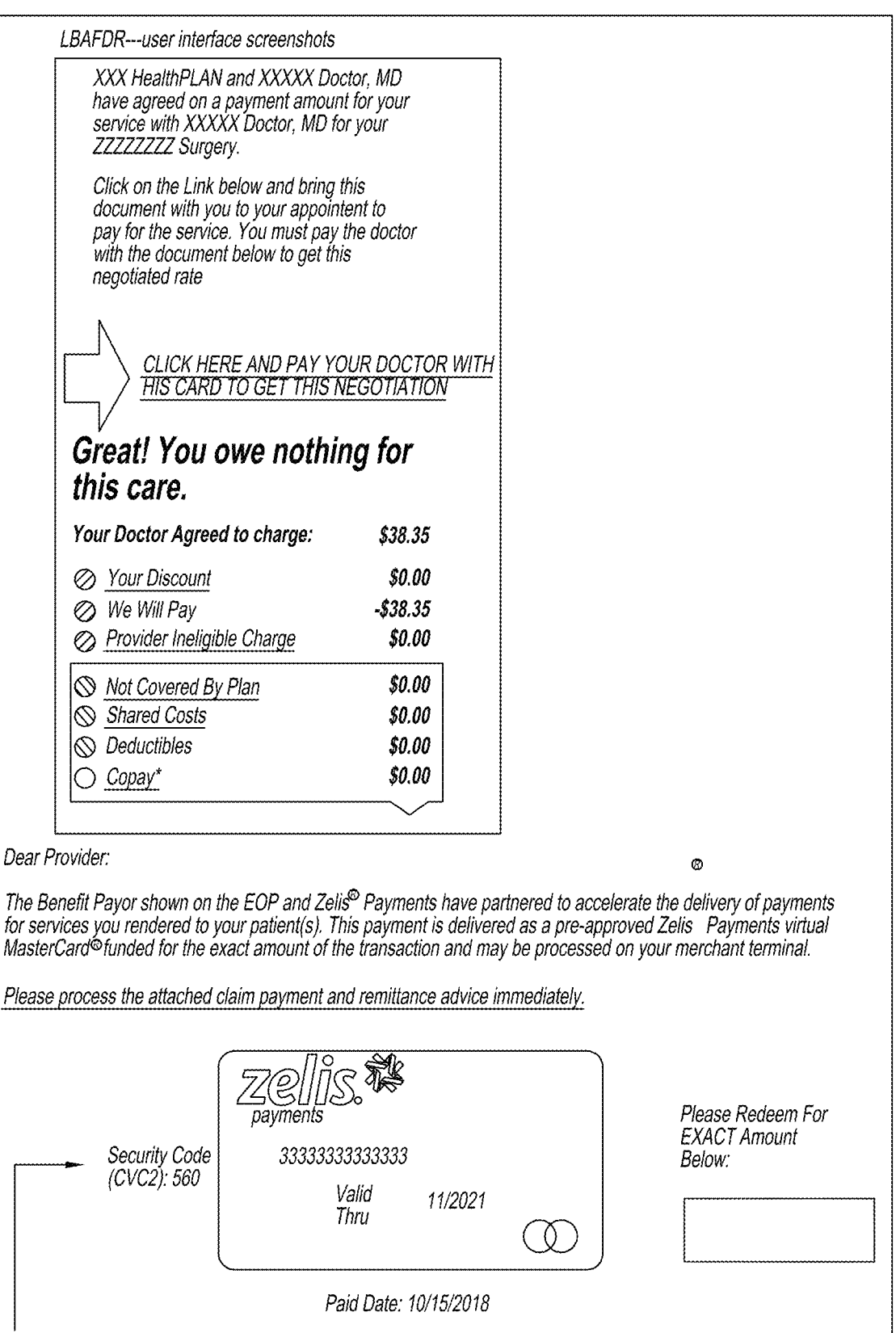

*LBAFDR---user interface screenshots*

*XXX HealthPLAN and XXXXX Doctor, MD have agreed on a payment amount for your service with XXXXX Doctor, MD for your ZZZZZZZZ Surgery.*

*Click on the Link below and bring this document with you to your appointent to pay for the service. You must pay the doctor with the document below to get this negotiated rate*

*CLICK HERE AND PAY YOUR DOCTOR WITH HIS CARD TO GET THIS NEGOTIATION*

Great! You owe nothing for this care.

| Your Doctor Agreed to charge: | $38.35 |
|---|---|
| ⊘ Your Discount | $0.00 |
| ⊘ We Will Pay | -$38.35 |
| ⊘ Provider Ineligible Charge | $0.00 |
| ⊘ Not Covered By Plan | $0.00 |
| ⊘ Shared Costs | $0.00 |
| ⊘ Deductibles | $0.00 |
| ◯ Copay* | $0.00 |

*Dear Provider:*

*The Benefit Payor shown on the EOP and Zelis® Payments have partnered to accelerate the delivery of payments for services you rendered to your patient(s). This payment is delivered as a pre-approved Zelis Payments virtual MasterCard® funded for the exact amount of the transaction and may be processed on your merchant terminal.*

*Please process the attached claim payment and remittance advice immediately.*

*zelis payments*

*Security Code (CVC2): 560*

*33333333333333*

*Valid Thru 11/2021*

*Please Redeem For EXACT Amount Below:*

*Paid Date: 10/15/2018*

*Fig. 3A*

ADVANCED EXPLANATION OF BENEFITS

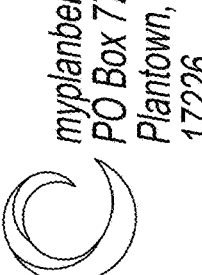

myplanbenefits
PO Box 770
Plantown, NJ
17226

Suzanne Member
120 Ram Head Rd
Cruz Bay, CA 09223

SUBSCRIBER INFORMATION
GROUP NAME HERE

MEMBER ID # BCS121234588H          Group # 000012345

An EOB is a statement showing how claims were processed.
This is not a bill. Your provider(s) may bill you directly for any
amount you may owe. KEEP FOR YOUR RECORDS

 Log in to Access for Members at your insurance
company to see plan and claim details or to contact
us through our secure Message Center

 Have questions about this EOB? Customer
Advocates are here to help! 800-555-5555

TOTAL OF CLAIM(S)

| Amount billed | $2641.61 |
|---|---|
| Discount, reduction and payments | -$1886.41 |
| You may have to pay your provider | $755.20 |

PRE-SERVICE GOOD FAITH ESTIMATE

*Fig. 3B*

SERVICE DETAILS - CLAIM (1)

PATIENT: JON SMITH     PROVIDER: Elitecare League City
SERVICE DATE: 2/20/2020

| | | PLAN PROVISIONS | | MEMBER RESPONSIBILITY | | |
|---|---|---|---|---|---|---|
| Benefits Description | Amount Billed | Discounts and deductions | Amount covered (allowed) | Deductible and copay amount | Coinsurance | Amount not covered |
| EMERG SERVICE LVL 2 | $1698.90 | $0 | $1217 | $250.00 | $243.40 | $231.8 |
| LABORATORY SERVICES | $427.31 | $318.34 | $108.97 | $0 | $0 | $0 |
| RADIOLOGY SERVICES | $115.50 | $86.05 | $29.45 | $0 | $0 | $0 |
| MEDICATIONS | $400 | $302.93 | $67.07 | $0 | $0 | $30 |
| ▫ | ▫ | ▫ | ▫ | ▫ | ▫ | ▫ |
| ▫ | ▫ | ▫ | ▫ | ▫ | ▫ | ▫ |
| ▫ | ▫ | ▫ | ▫ | ▫ | ▫ | ▫ |
| ▫ | ▫ | ▫ | ▫ | ▫ | ▫ | ▫ |
| CLAIM TOTALS | $2641.61 | $707.32 | $1422.49 | $250.00 | $243.40 | $261.80 |

BENEFITS ESTIMATE SUMMARY, RESOURCES, RECOMMENDATIONS

SUMMARY - CLAIM (1)

| PLAN PROVISIONS | | MEMBER RESPONSIBILITY | |
|---|---|---|---|
| Amount covered (allowed) | $1886.41 | Deductible and copay amount | $250.00 |
| Deductible and copay amount | $250.00 | Coinsurance | $243.40 |
| Coinsurance | $243.40 | Approval not covered | $261.80 |
| Total | $2379.81 | You may have to pay your provider | $755.20 |

| COST SAVING RECOMMENDATIONS |
|---|
| In-network physicians who may save you money may be found at myplanbenefits.com/providers |
| Wellness program information may be found at myplanbenefits.com/wellness |

*Fig. 3C*

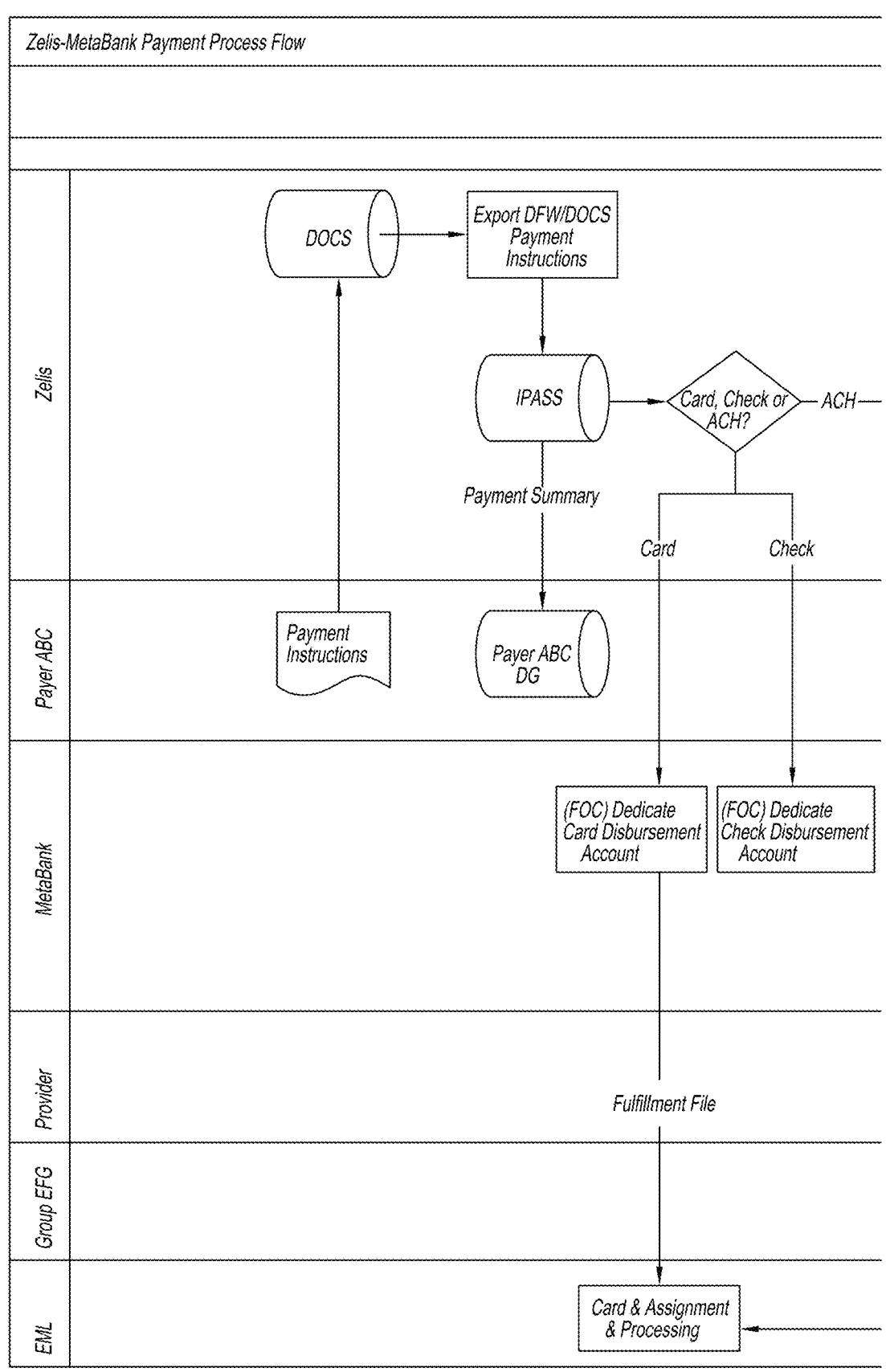
LBAFDR - datagraph     *Fig. 6A*

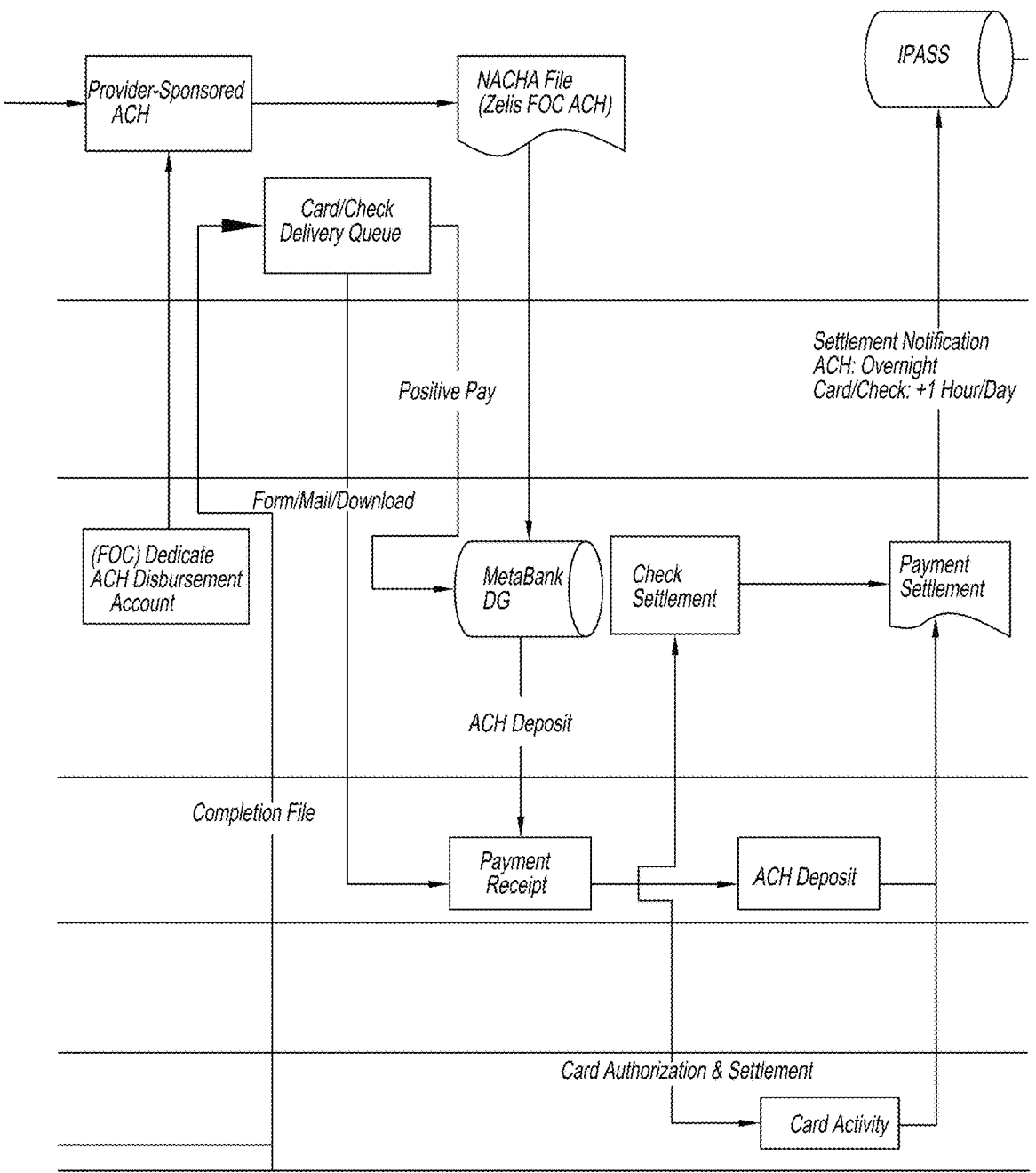
*LBAFDR - datagraph*                    *Fig. 6B*

LBAFDR - datagraph

*LBAFDR---datastructures*

| | |
|---|---|
| *B.HL.NM1.NM1* | *NM1\|QC\|1\|SMITH\|JOHN\|E\|\|\|24\|9999999999A* |
| *B.HL.NM1.N3* | *N3\|Unknown* |
| *B.HL.NM1.N4* | *N4\|Unknown\|WI 54601* |
| *B.HL.NM1.DMG* | *DMG\|D8\|19550710\|M* |
| *B.HL.CLM.CLM* | *CLM\|0\|314\|\|\|13>A>1\|\|A\|Y\|I* |
| *B.HL.CLM.DTP* | *DTP\|434\|RD8\|20210801-20210801* |
| *B.HL.CLM.DTP* | *DTP\|435\|DT\|202108011200* |
| *B.HL.CLM.DTP* | *DTP\|096\|TM\|1200* |
| *B.HL.CLM.CL1* | *CL1\|9\|\|01* |
| *B.HL.CLM.REF* | *REF\|D9\|192019240* |
| *B.HL.CLM.REF* | *REF\|01H\|182114342* |
| *B.HL.CLM.REF* | *REF\|F8\|99999999* |
| *B.HL.CLM.NTE* | *NTE\|ADD\|1052* |
| *B.HL.CLM.HI* | *HI\|ABK>R5383* |
| *B.HL.CLM.HI* | *HI\|ABF>Z136\|ABF>R5383\|ABF>Z136* |
| *B.HL.CLM.NM1.NM1* | *NM1\|82\|2\|GUNDERSEN LUTHERAN MEDICAL CEN\|\|\|\|\|XX\|1376593442* |
| *B.HL.CLM.NM1.NM1* | *NM1\|77\|2\|GUNDERSEN LUTHERAN MEDICAL CEN* |
| *B.HL.CLM.NM1.NM1.N3* | *N3\|1910 SOUTH AVE* |
| *B.HL.CLM.NM1.NM1.N4* | *N4\|LA CROSSE\|WI\|54601* |

*Fig. 7A*

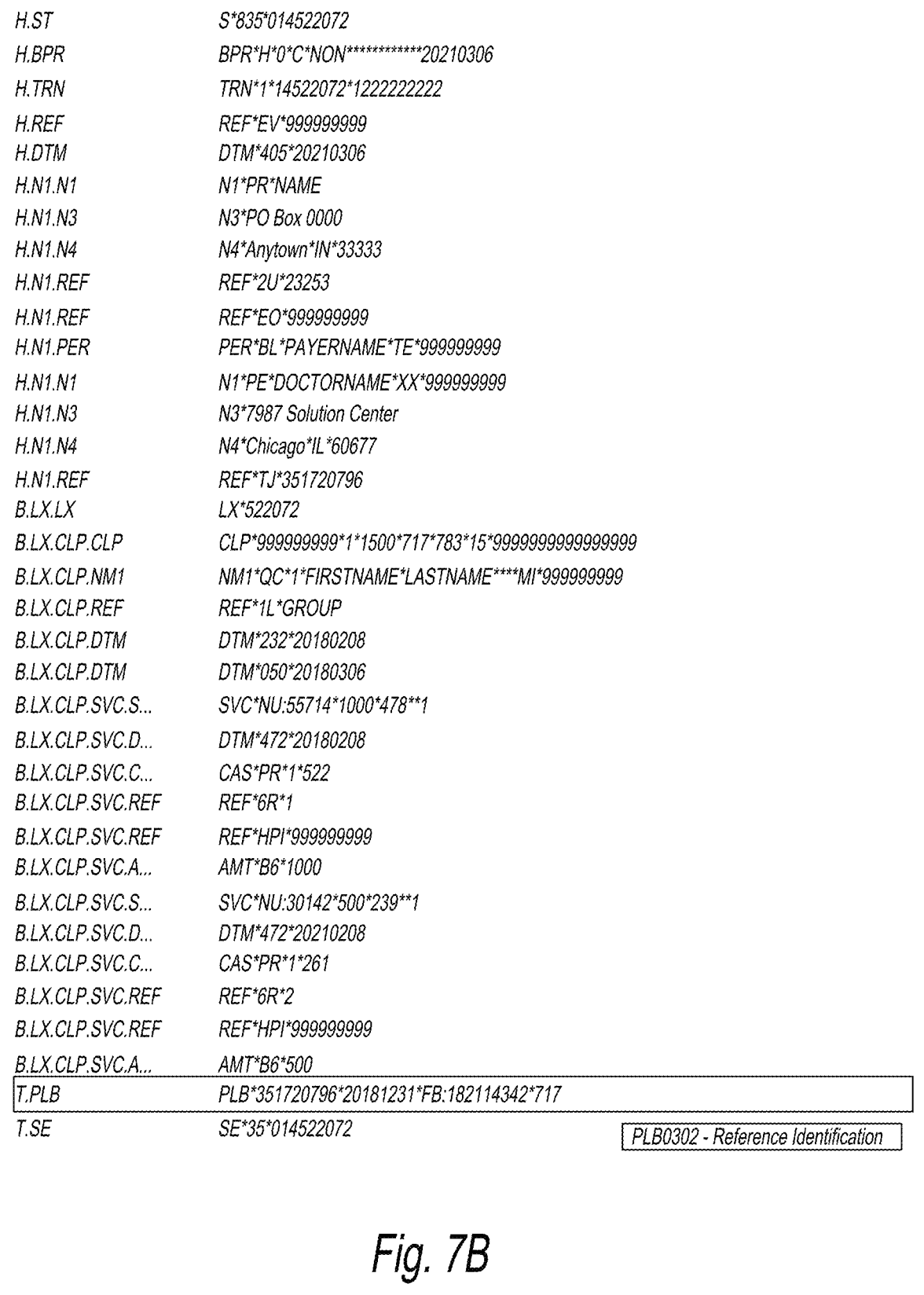

| | |
|---|---|
| H.ST | S*835*014522072 |
| H.BPR | BPR*H*0*C*NON***********20210306 |
| H.TRN | TRN*1*14522072*1222222222 |
| H.REF | REF*EV*999999999 |
| H.DTM | DTM*405*20210306 |
| H.N1.N1 | N1*PR*NAME |
| H.N1.N3 | N3*PO Box 0000 |
| H.N1.N4 | N4*Anytown*IN*33333 |
| H.N1.REF | REF*2U*23253 |
| H.N1.REF | REF*EO*999999999 |
| H.N1.PER | PER*BL*PAYERNAME*TE*999999999 |
| H.N1.N1 | N1*PE*DOCTORNAME*XX*999999999 |
| H.N1.N3 | N3*7987 Solution Center |
| H.N1.N4 | N4*Chicago*IL*60677 |
| H.N1.REF | REF*TJ*351720796 |
| B.LX.LX | LX*522072 |
| B.LX.CLP.CLP | CLP*999999999*1*1500*717*783*15*9999999999999999 |
| B.LX.CLP.NM1 | NM1*QC*1*FIRSTNAME*LASTNAME****MI*999999999 |
| B.LX.CLP.REF | REF*1L*GROUP |
| B.LX.CLP.DTM | DTM*232*20180208 |
| B.LX.CLP.DTM | DTM*050*20180306 |
| B.LX.CLP.SVC.S... | SVC*NU:55714*1000*478**1 |
| B.LX.CLP.SVC.D... | DTM*472*20180208 |
| B.LX.CLP.SVC.C... | CAS*PR*1*522 |
| B.LX.CLP.SVC.REF | REF*6R*1 |
| B.LX.CLP.SVC.REF | REF*HPI*999999999 |
| B.LX.CLP.SVC.A... | AMT*B6*1000 |
| B.LX.CLP.SVC.S... | SVC*NU:30142*500*239**1 |
| B.LX.CLP.SVC.D... | DTM*472*20210208 |
| B.LX.CLP.SVC.C... | CAS*PR*1*261 |
| B.LX.CLP.SVC.REF | REF*6R*2 |
| B.LX.CLP.SVC.REF | REF*HPI*999999999 |
| B.LX.CLP.SVC.A... | AMT*B6*500 |
| T.PLB | PLB*351720796*20181231*FB:182114342*717 |
| T.SE | SE*35*014522072 |

PLB0302 - Reference Identification

*Fig. 7B*

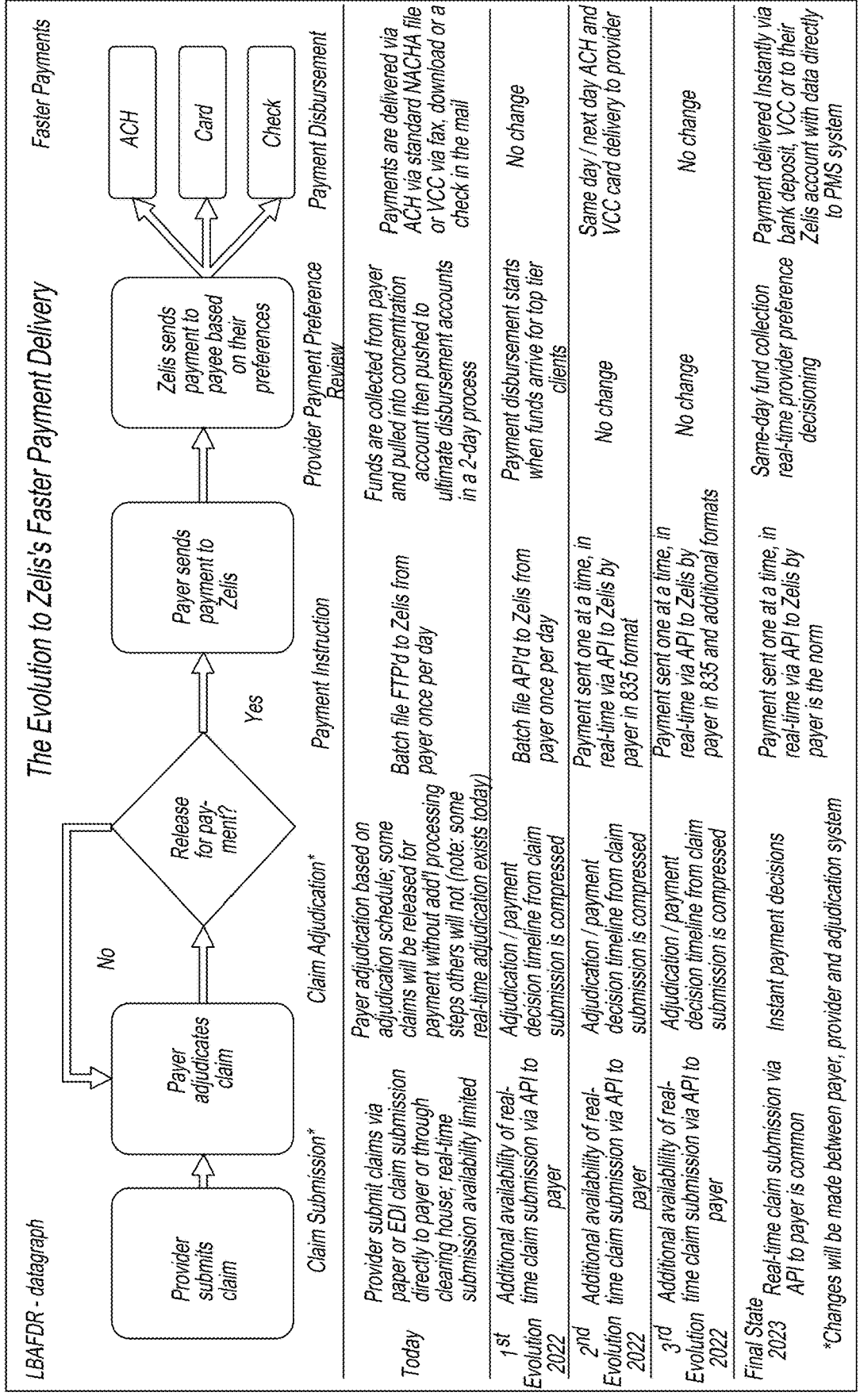

The Evolution to Zelis's Faster Payment Delivery

*Fig. 8*

LBAFDR - datagraph

| | Claim Submission* | Claim Adjudication* | Payment Instruction | Provider Payment Preference Review | Payment Disbursement |
|---|---|---|---|---|---|
| Today | Provider submit claims via paper or EDI claim submission directly to payer or through clearing house; real-time submission availability limited | Payer adjudication based on adjudication schedule; some claims will be released for payment without add'l processing steps others will not (note: some real-time adjudication exists today) | Batch file FTP'd to Zelis from payer once per day | Funds are collected from payer and pulled into concentration account then pushed to ultimate disbursement accounts in a 2-day process | Payments are delivered via ACH via standard NACHA file or VCC via fax, download or a check in the mail |
| 1st Evolution 2022 | Additional availability of real-time claim submission via API to payer | Adjudication / payment decision timeline from claim submission is compressed | Batch file API'd to Zelis from payer once per day | Payment disbursement starts when funds arrive for top tier clients | No change |
| 2nd Evolution 2022 | Additional availability of real-time claim submission via API to payer | Adjudication / payment decision timeline from claim submission is compressed | Payment sent one at a time, in real-time via API to Zelis by payer in 835 format | No change | Same day / next day ACH and VCC card delivery to provider |
| 3rd Evolution 2022 | Additional availability of real-time claim submission via API to payer | Adjudication / payment decision timeline from claim submission is compressed | Payment sent one at a time, in real-time via API to Zelis by payer in 835 and additional formats | No change | No change |
| Final State 2023 | Real-time claim submission via API to payer is common | Instant payment decisions | Payment sent one at a time, in real-time via API to Zelis by payer is the norm | Same-day fund collection real-time provider preference decisioning | Payment delivered instantly via bank deposit, VCC or to their Zelis account with data directly to PMS system |

*Changes will be made between payer, provider and adjudication system

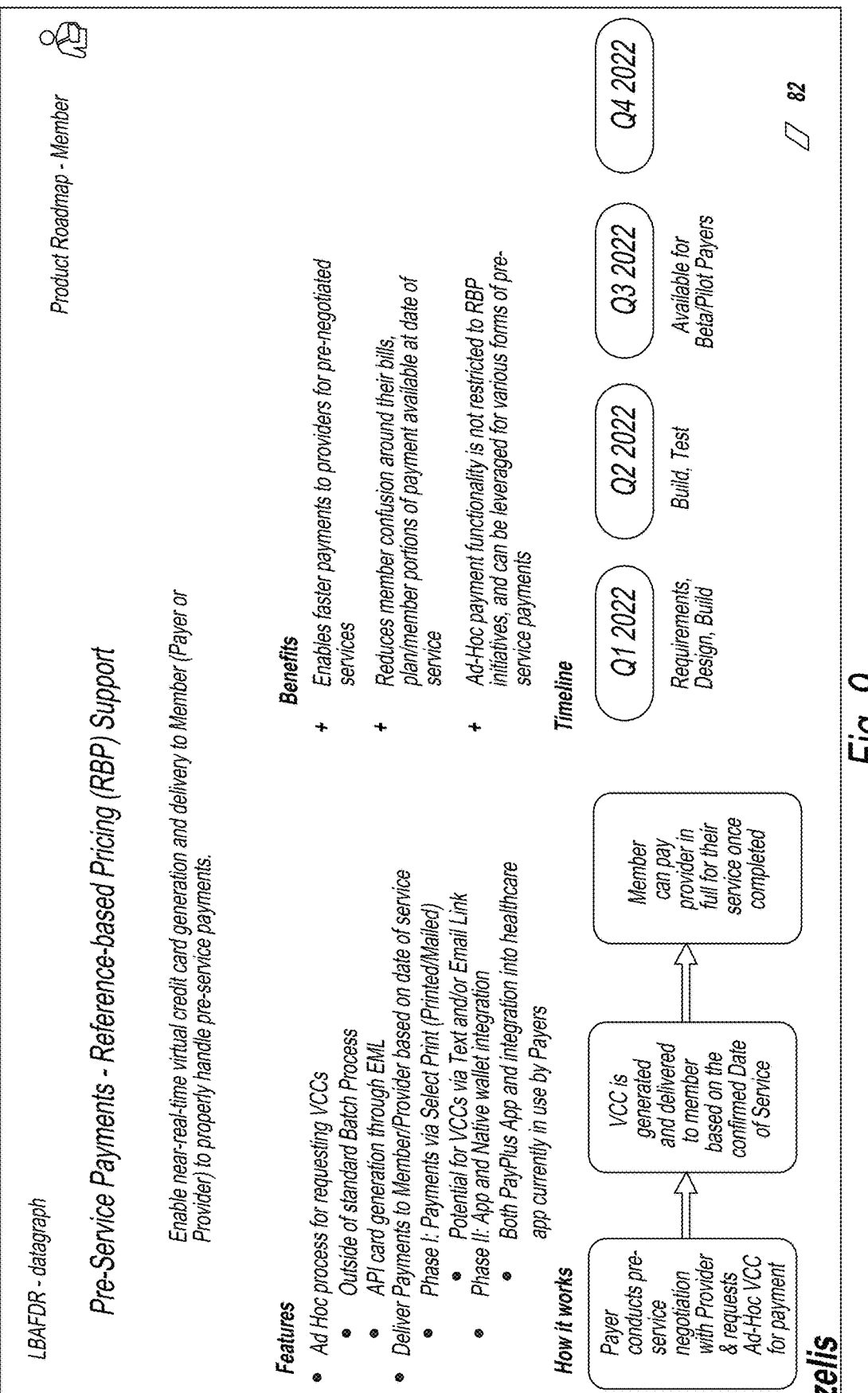

*LBAFDR - datagraph*

*Product Roadmap - Member*

Pre-Service Payments - Reference-based Pricing (RBP) Support

Enable near-real-time virtual credit card generation and delivery to Member (Payer or Provider) to properly handle pre-service payments.

Features

- Ad Hoc process for requesting VCCs
  - Outside of standard Batch Process
  - API card generation through EML
- Deliver Payments to Member/Provider based on date of service
  - Phase I: Payments via Select Print (Printed/Mailed)
    - Potential for VCCs via Text and/or Email Link
  - Phase II: App and Native wallet integration
    - Both PayPlus App and integration into healthcare app currently in use by Payers

Benefits

+ Enables faster payments to providers for pre-negotiated services
+ Reduces member confusion around their bills, plan/member portions of payment available at date of service
+ Ad-Hoc payment functionality is not restricted to RBP initiatives, and can be leveraged for various forms of pre-service payments

Timeline

( Q1 2022 )  ( Q2 2022 )  ( Q3 2022 )  ( Q4 2022 )

Requirements,   Build, Test   Available for
Design, Build                 Beta/Pilot Payers

How it works

Payer conducts pre-service negotiation with Provider & requests Ad-Hoc VCC for payment  →  VCC is generated and delivered to member based on the confirmed Date of Service  →  Member can pay provider in full for their service once completed zelis

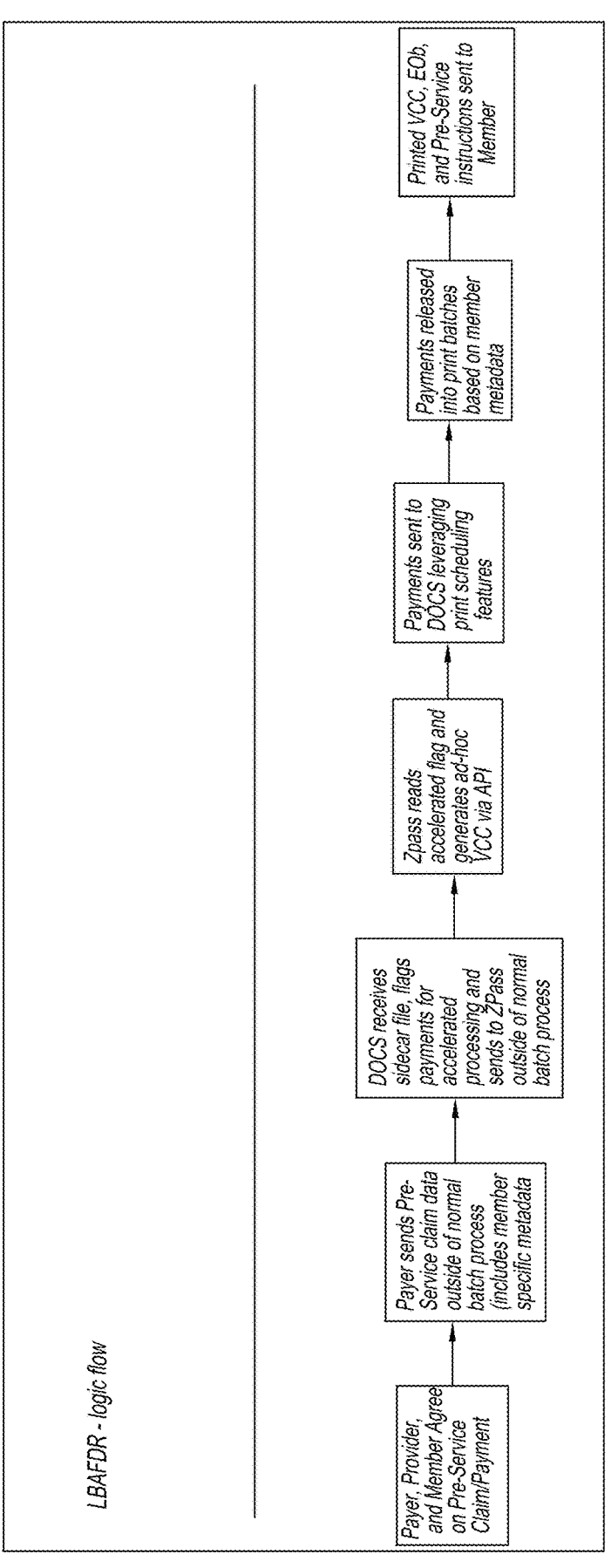

LBAFDR - logic flow

Payer, Provider, and Member Agree on Pre-Service Claim/Payment

Payer sends Pre-Service claim data outside of normal batch process (includes member specific metadata)

DOCS receives sidecar file, flags payments for accelerated processing and sends to ZPass outside of normal batch process Zpass reads accelerated flag and generates ad-hoc VCC via API Payments sent to DOCS leveraging print scheduling features Payments released into print batches based on member metadata Printed VCC, EOb, and Pre-Service instructions sent to Member

Fig. 12

LATE BINDING ASSET FUNDING DATASTRUCTURE AND ROUTER APPARATUSES, PROCESSES AND SYSTEMS

PRIORITY CLAIM

Applicant hereby claims benefit to priority under 35 USC § 119 as a non-provisional conversion of U.S. provisional patent application Ser. No. 63/245,931, filed Sep. 20, 2021, entitled "Late Binding Asset Funding Datastructure and Router Apparatuses, Processes and Systems".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address electronic payment systems, and more particularly, include Late Binding Asset Funding Datastructure and Router Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Medical service providers are often paid for their services by payors other than a patient. For example, insurance companies, self-funded corporations, unions, and other third-party payors may adjudicate claims in accordance with a plan of benefits for their plan members (the insured patient). Payment from patients is typically accepted in the form of cash, check, or credit/debit card.

BRIEF DESCRIPTION OF THE DRAWINGS

Appendices and/or drawings illustrating various, non-limiting, example, innovative aspects of the Late Binding Asset Funding Datastructure and Router Apparatuses, Processes and Systems (hereinafter "LBAFDR") disclosure, include:

FIG. 1 shows non-limiting, example embodiments of a screenshot illustrating user interface(s) of the LBAFDR;

FIG. 2 shows non-limiting, example embodiments of a screenshot illustrating user interface(s) of the LBAFDR;

FIG. 3 shows non-limiting, example embodiments of a screenshot illustrating user interface(s) of the LBAFDR;

FIG. 7 shows non-limiting, example embodiments of a data structure for the LBAFDR;

FIG. 8 shows non-limiting, example embodiments of a datagraph illustrating data flow(s) for the LBAFDR;

FIG. 9 shows non-limiting, example embodiments of a datagraph illustrating data flow(s) for the LBAFDR;

FIG. 12 shows non-limiting, example embodiments of a logic flow illustrating a Fund On Clear component for the LBAFDR;

Figure 4:
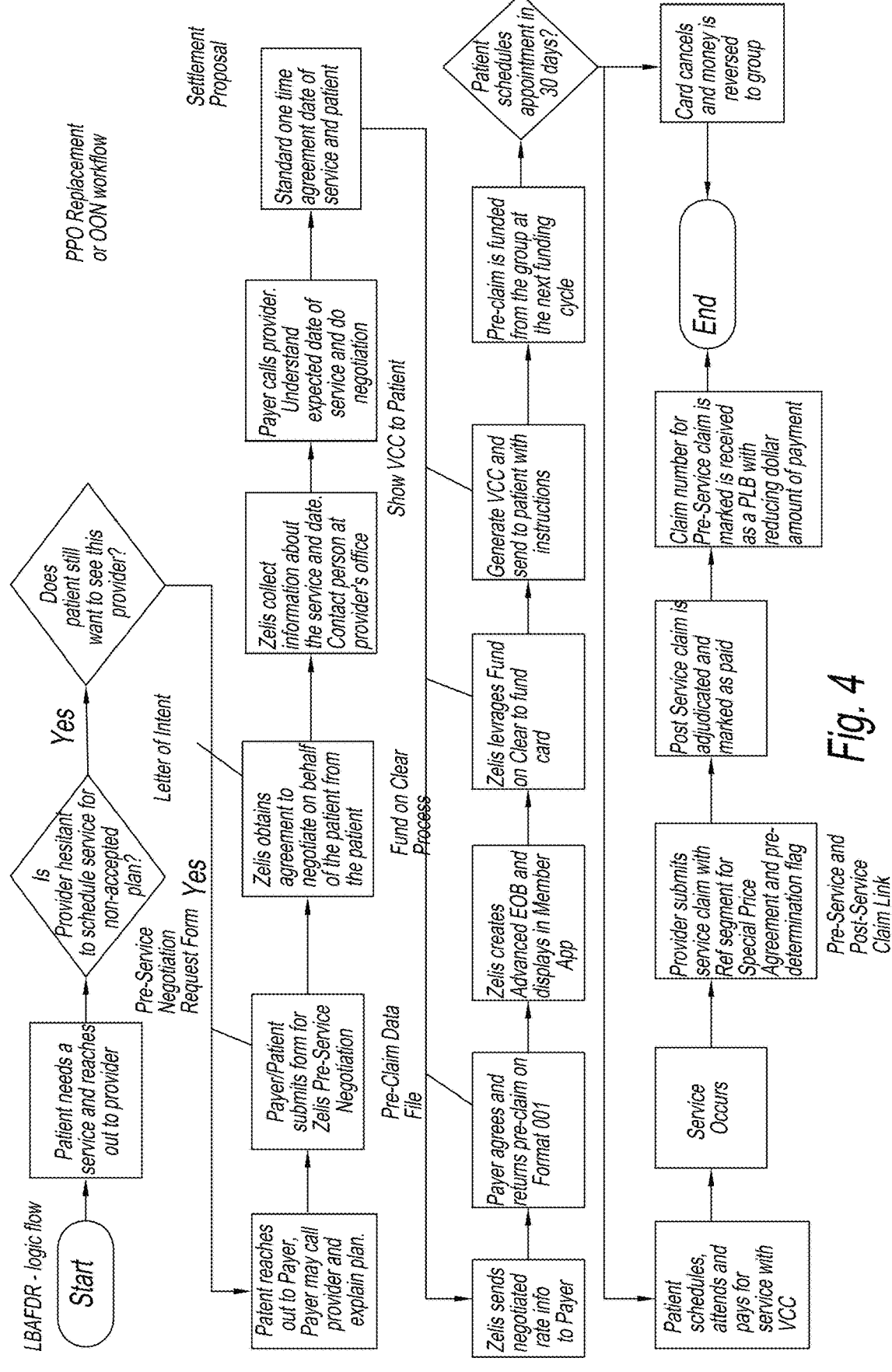
FIG. 4 shows non-limiting, example embodiments of a logic flow illustrating a Fund On Clear component for the LBAFDR.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Late Binding Asset Funding Datastructure and Router Apparatuses, Processes and Systems (hereinafter "LBAFDR") transforms print check, payment instructions, documents, virtual card import, payment inputs, via LBAFDR components (e.g., post-presentment funding, etc. components), into ACH instructions, post-presentment funding disbursement outputs. The LBAFDR components, in various embodiments, implement advantageous features as set forth below.

Introduction

The LBAFDR provides unconventional features that were never before available in electronic payment systems (e.g., import, via the at least one processor, a variable payment datastructure, in which the variable payment datastructure is structured as including any of: a print check image, a virtual payment card, a direct deposit; create a variable payment datastructure record, in which the variable payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account; provide a payment type information datastructure to a target facilitator, in which the payment type information datastructure is any of: a positive payment information datastructure, fulfillment file card datastructure, a ACH instruction datastructure, in which the ACH instruction includes instructions to debit dedicated fund-later-delegate ACH disbursement account and credit a member account, in which the target facilitator is any of: a bank check clearance server, a card processor server, a ACH bank server; obtain funding information datastructure from target facilitator; provide credit back to variable payment datastructure record based on the obtained funding information datastructure; pre-service claim datastructure to handle pre-service negotiated payments; pre-service claims tied datastructure for post-service claims to support auditing and processing).

In one embodiment, LBAFDR includes Post-presentment funding mechanism that may be, for example, provided as a healthcare offering. In one embodiment, it provides a flexible funding solution that may simplify payment reconciliation for our Payer-clients without disrupting their existing financial processes or group regulatory requirements while giving them leverage through rapid payment for negotiating with providers pre-service.

In certain scenarios, certain employer groups may require its Payers & LBAFDR to have a different approach as it relates to funding payments to providers. For example, certain Municipalities and Governmental entitles have clauses in which the state/municipality cannot issue funds out of their bank account until such payment is processed by Provider. Given these entities may be mandated by PPACA to support electronic payment fulfillment, LBAFDR my flexibly provide a "Post-presentment funding" model.

LBAFDR provides the capability to initiate payments to providers and members before any payer/group before any funding is collected. This may allow payers/groups to retain all funding for their claim payments within their dedicated account(s), until settlement is confirmed via LBAFDR and their partnering bank. The funding to support the outbound ACH/Check/Card may be collected later, but no later than the evening of the payment's execution (e.g., Dr. John cashed his check). The Post-presentment funding Model is viewed as an exception from our standard processing and would only allow certain employer group types to support this.

With the pre-funding model, the system receives its payment instructions for thousands of individual payers who represent employer groups. As part of being self funded, these employer groups are responsible for funding a portion of their employees respective claim liability. After a claim payment is adjudicated and deemed ready to pay, the pre-funding model receives its instruction to process payment and begin the payments process. The pre-funding model may debit the respective employer group bank account and upon confirmation of funds may send the appropriate payment to provider via Virtual Card or ACH.

This pre-funding model might not provide the ability to disburse payments to providers until the system collects the funding to support the outbound payments (e.g., pre-funding prior to delivery).

LBAFDR Example Solution

In one non-limiting example solution, detailed below, we determined a best workflow to leverage in order to facilitate payments without pre-funding and therefore gain leverage in the speed of payment for negotiating payments with doctors pre-service. The primary requirement is that funding can, in one non-limiting example, only be collected upon confirmed payment settlement, so alternative solutions were not applicable.

High Level Overview

Payment instructions may continue to route through the file processing workflow that was built in conjunction with our location, but may be marked as pre-service payment instructions.

1. Payment creation may bypass our default ACH collection procedures, that would normally prevent the system from automatically issuing an ACH debit on the associated payer/group account.
2. Payment statuses may move from a Not Processed, Queued For Payment, Out for Payment state (e.g., delivered) within 1 business day of import.
3. Upon payment confirmation, LBAFDR may deliver a settlement notification to the respective payer/group and: (Standard Funding)—LBAFDR may initiate an aggregated debit transaction on the payer/group's associated bank account at a later date.
4. Reimbursement from the payer/group back to LBAFDR may mark the end of the payment cycle as no additional funding should be owed up to this point. The next round of payment settlements that LBAFDR receives may restart the collection processes noted in step 3.

Bank Account Structure

1. Post-Presentment Funding (with MetaBank)
   a. post-presentment fundingPost-presentment funding Concentration (utilized for ACH collection and Push funding reimbursement): Account #1
   b. ACH Disbursement (utilized for post-presentment funding ACH disbursement to providers or members): Account #2
   c. Credit Card Disbursement (utilized for post-presentment funding Card disbursement to providers): Account #3
   d. Check Disbursement (utilized for post-presentment funding Check disbursement to providers: Account #4
2. Post-Presentment Funding Revenue
   a. Interchange Account (card and ACH interchange may be deposited via EML into UMB Interchange account)

LBAFDR includes a network replacement/out of network pre-service negation and payment product leveraging proprietary technologies in our unique product suite to allow for a pre-service negotiation and payment process which supports PPO replacement and out of network service support.

LBAFDR

FIG. 1 shows non-limiting, example embodiments of a screenshot illustrating user interface(s) of the LBAFDR. The left part of the figure illustrates the part of the process, e.g., advocacy submission, where the patient may login to the LBAFDR member app and submit a request for advocacy and sign a Letter of Intent indicating that LBAFDR can represent them to the provider. It may include the contact information for the doctor and details around what service the patient needs.

The right part of the figure illustrates an example Explanation of Payment sent to the Provider with the 835.

FIG. 2 shows non-limiting, example embodiments of a screenshot illustrating user interface(s) of the LBAFDR. The letter of intent may be signed with the negotiation request and allows LBAFDR to speak to the provider on behalf of the patient.

FIG. 3 shows non-limiting, example embodiments of a screenshot illustrating user interface(s) of the LBAFDR.

Pre-Service Claim File Format

In one embodiment, LBAFDR may provide a new document type on our normal document files. This document type may include AEOB with Payment. It may include everything about the claim for the AEOB and may also create a Post-presentment funding card in our normal provider payment processing.

Post-Presentment Funding (Funding the Virtual Card)

LBAFDR leverages a solution to fund cards only after presentment. It is a widely available technology in the market (supplied by one known banking partner to many vendors like LBAFDR).

Day 1: Payment is imported and assigned as "LBAFDR Virtual Card"

Day 2: Payment record is created using the dedicated post-presentment funding card account. Fulfillment file is distributed to card processor.

Day 3 (am): Completion files are returned to LBAFDR from EML.

Day 3 (pm): Payment is available to download or queued for delivery.

Day 4: Payment is received by provider. Provider initiates card authorization+settlement Day 5 (am): Card activity detail is provided to LBAFDR via card processor. Virtual Card status is updated in the system and funding totals are added to collection queue.

At a later date, but no later than the card execution evening: ACH instructions are delivered from LBAFDR to banking partner, to debit the total amount owed from the Payer/Group's bank account and credit post-presentment funding concentration account Next Day (am): Funding for card settlements that occurred on Previous Day are realized Next Day (pm): Funding transfer for card settlements are credited back into post-presentment funding card disbursement account

Show the VCC to the Member

Once the virtual card is created, it may not be sent directly to the provider, but instead may be delivered to the patient/or their representative via a link to the image of the card. This card template may include instructions to the patient on how to use this card to pay for their service. It may also include an advanced explanation of benefits which shows their expected cost sharing, if any. The care may also include instructions for the provider on how to submit the claim, including the number of the pre-estimate claim.

FIG. 4 shows non-limiting, example embodiments of a logic flow illustrating a Fund On Clear component for the LBAFDR. The red identified callouts have supporting collateral in this document following the process workflow.

Patients often find themselves wanting to receive services from a doctor who is either out of network with their PPO plan or they participate in a PPO replacement plan. When this happens, the patient may initiate a request for pre-service negotiation. LBAFDR may negotiate a rate with a doctor, leveraging historical reimbursement data for this provider on behalf of a patient with the understanding that the full payment of the plan portion may be paid in advance. Once an agreement has been rendered, LBAFDR may notify the payer of the agreed service, price and expected date of service. The payer may send a request for an advanced Explanation of Benefit back to LBAFDR in our proprietary claims document format 001 record and indicate that this document type is "AEOB with payment". Once this is complete, LBAFDR may leverage a process to create a virtual credit card for the negotiated amount. The card may remain unfunded until it is used. LBAFDR may notify the patient that a negotiation is complete and they can schedule service. LBAFDR may pull funding from the patients employer group on the next funding cycle leveraging the AEOB record to secure the funding. Meanwhile, the patient may retrieve a VCC (which is not funded until it is used) to pay for the service at the appointment time. After the payment is used and the service is rendered, a claim may be received from the provider that ties the pre-service estimate and the post-service claim together for reporting and indicates the portion that has been paid in advance.

Figure 5:
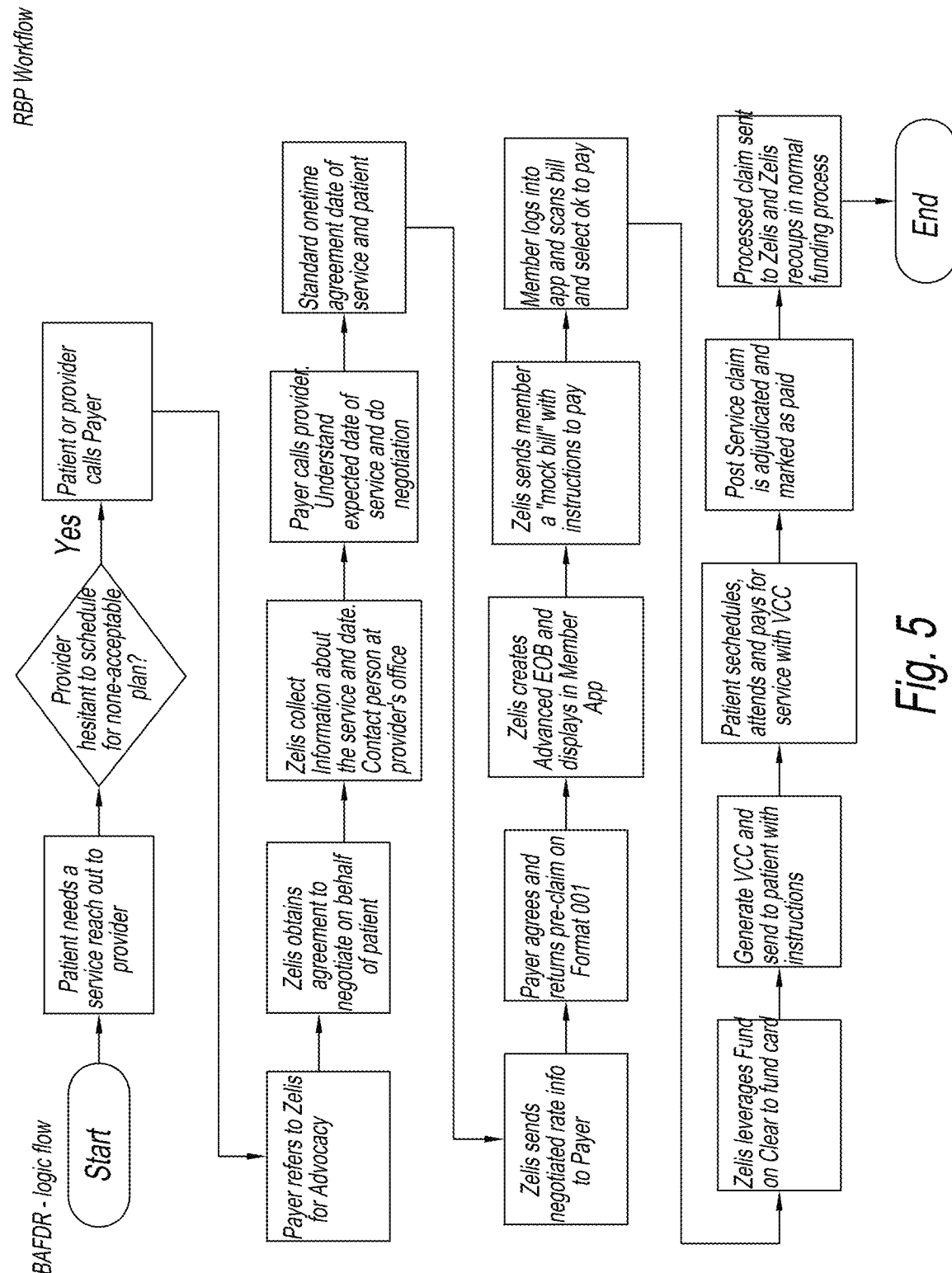
FIG. 5 shows non-limiting, example embodiments of a logic flow illustrating a Fund On Clear component for the LBAFDR.

FIG. 5 shows non-limiting, example embodiments of a logic flow illustrating a Fund On Clear component for the LBAFDR.

Figure 6C:
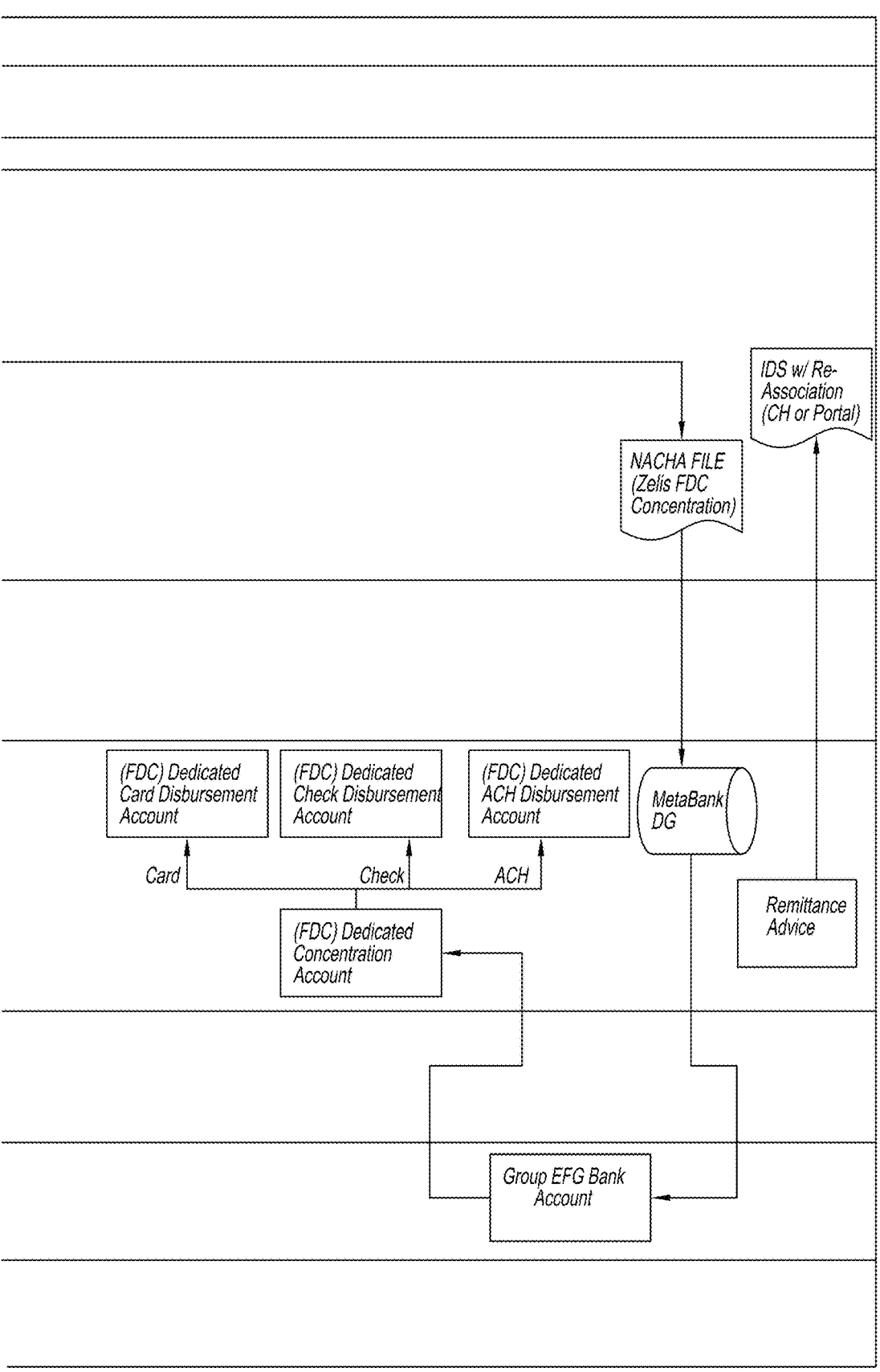
FIG. 6 A-C (hereinafter FIG. 6, FIG. 6) shows non-limiting, example embodiments of a datagraph illustrating data flow(s) for the LBAFDR.

FIG. 6 shows non-limiting, example embodiments of a datagraph illustrating data flow(s) for the LBAFDR.

The Process Outline Includes

Checks

Day 1: Payment is imported and assigned as "Print Check"

Day 2: Payment record is created using the dedicated post-presentment funding check disbursement account. Positive Pay information submitted to bank.

Day 3: Payment is mailed to provider/member.

Day 4: Payment is received by provider/member and presented to bank for deposit

Day 5 (am): Check posting detail is provided to LBAFDR. Check status is updated in system and funding totals are added to collection queue.

Day 5 (pm/overnight): ACH instructions are delivered to bank to debit the total amount owed from the Payer/Group's bank account and credit post-presentment funding concentration account Day 6 (am): Funding for check settlements that occurred on Day 4 are realized Day 6 (pm): Funding transfer for check settlements are credited back into post-presentment funding check disbursement account

Credit Cards

Day 1: Payment is imported and assigned as "LBAFDR Virtual Card"

Day 2: Payment record is created using the dedicated post-presentment funding card account. Fulfillment file is distributed to card processor.

Day 3 (am): Completion files are returned to LBAFDR from EML.

Day 3 (pm): Payment is available to download or queued for Fax/Print.

Day 4: Payment is received by provider. Provider initiates card authorization+settlement Day 5 (am): Card activity detail is provided to LBAFDR via card processor. Virtual Card status is updated in the system and funding totals are added to collection queue.

Day 5 (pm/overnight): ACH instructions are delivered from LBAFDR to banking partner, to debit the total amount owed from the Payer/Group's bank account and credit post-presentment funding concentration account Day 6 (am): Funding for card settlements that occurred on Day 4 are realized Day 6 (pm): Funding transfer for card settlements are credited back into post-presentment funding card disbursement account

ACH

Day 1: Payment is imported and assigned as "LBAFDR Direct Deposit"

Day 2: Payment record is created using the dedicated post-presentment funding ACH disbursement account.

Day 2 (pm/overnight): ACH instructions to debit the post-presentment funding ACH disbursement account and credit the provider/member account are delivered from LBAFDR to the partnering bank Day 3 (am): Direct Deposit is assumed as settled. Direct Deposit status is updated in system and funding totals are added to collection queue.

Day 3 (mm/overnight): ACH instructions are delivered to bank to debit the total amount owed from the Payer/Group's bank account and credit post-presentment funding concentration account Day 4 (am): Funding for ACH settlements that occurred on Day 4 are realized Day 4 (pm): Funding transfer for ACH settlements are credited back into post-presentment funding card disbursement account Reporting External There are at least 6 client facing reports that may be impacted by Fund On-Clear:

| Report Name | Description |
| --- | --- |
| Post-Presentment Settlement Summary | The Post-Presentment Settlement Summary provides a summary-level view into the total funds that had settled in the preceding 24 hours. The total amount indicated on this report may reconcile to the total amount of the debit transaction that LBAFDR may initiate that evening.<br>This report can be run ad-hoc and can also be set up as subscription. |
| Post-Presentment Settlement Detail | The Fund On-Clear Settlement Detail may provide payment-level detail for settlements that occurred in the preceding 24 hours. The detail totals should reconcile to the Settlement Summary. All records are grouped by group/subgroup and Bank Account.<br>This report can be run ad-hoc and can also be set up as subscription. |
| ACH Failed Transactions | The ACH Failed Transactions report is a report that details any LBAFDR debit transaction initiated on the payer/group account where the recipient's bank rejected the transaction. This report is triggered and sent to the payer/group notifying them of the failure and the amount requested. Fund On-Clear transactions may be highlighted in "RED" to imply urgency for resolution. |

-continued

| Report Name | Description |
| --- | --- |
| Cancellation Report | This report can be run ad-hoc and can also be set up as a subscription.<br>The Cancellation report is a new report that identifies all payments that were cancelled from the prior day. It may include Fund On-Clear records as well as standard payments, if they were cancelled and did not require a reversal. |
| Billing Reconciliation | This report can be run ad-hoc and can also be set up as a subscription.<br>The Billing Reconciliation is a report, which has been modified to include the new cancellation detail noted above.<br>This report can be run ad-hoc and can also set up as a subscription. |

FIG. 7 shows non-limiting, example embodiments of a data structure for the LBAFDR.

Pre-Service Claim Reference on Post-Service Claim

Once the service is complete, the provider may have to follow instructions on the virtual credit card to submit the service correctly. Failure to do so may result in a clawback on a future payment.

On the 837 claim submission for the final claim, it may be marked as a Special Price Agreement. On the 835 (claim remittance advice) this number may appear in the PLB under Forwarding Balance. This may tie all the claims together.

835 Claim Remittance Advice from Payer to LBAFDR and on to Provider. Marked in the PLB segment, tying the reference number for the original pre-estimate.

FIG. 8 shows non-limiting, example embodiments of a datagraph illustrating data flow(s) for the LBAFDR.

FIG. 9 shows non-limiting, example embodiments of a datagraph illustrating data flow(s) for the LBAFDR.

Figure 10:
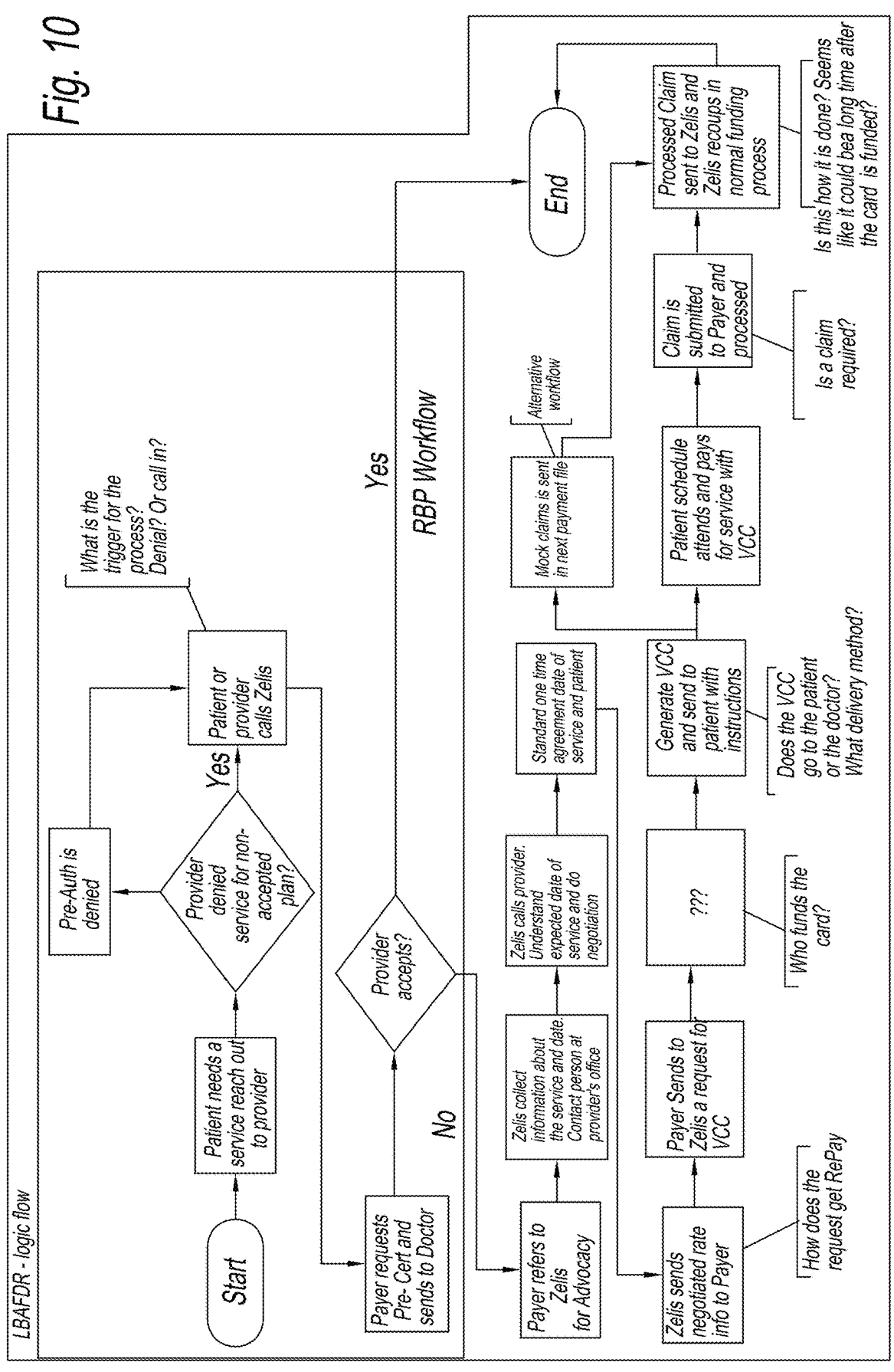
FIG. 10 shows non-limiting, example embodiments of a logic flow illustrating a Fund On Clear component for the LBAFDR.

FIG. 10 shows non-limiting, example embodiments of a logic flow illustrating a Fund On Clear component for the LBAFDR.

Figure 11:
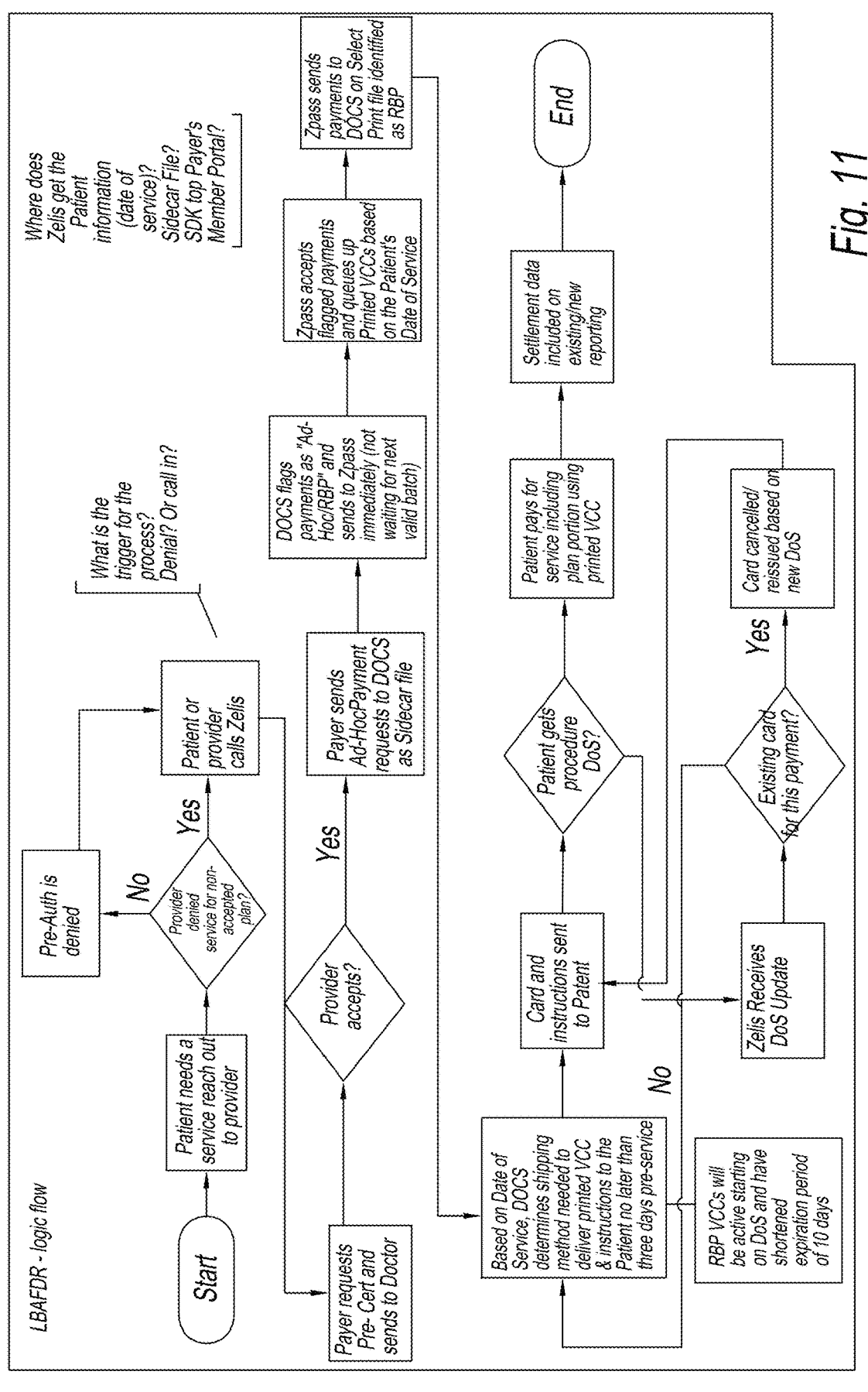
FIG. 11 shows non-limiting, example embodiments of a logic flow illustrating a Fund On Clear component for the LBAFDR.

FIG. 11 shows non-limiting, example embodiments of a logic flow illustrating a Fund On Clear component for the LBAFDR.

FIG. 12 shows non-limiting, example embodiments of a logic flow illustrating a Fund On Clear component for the LBAFDR.

Figure 13:
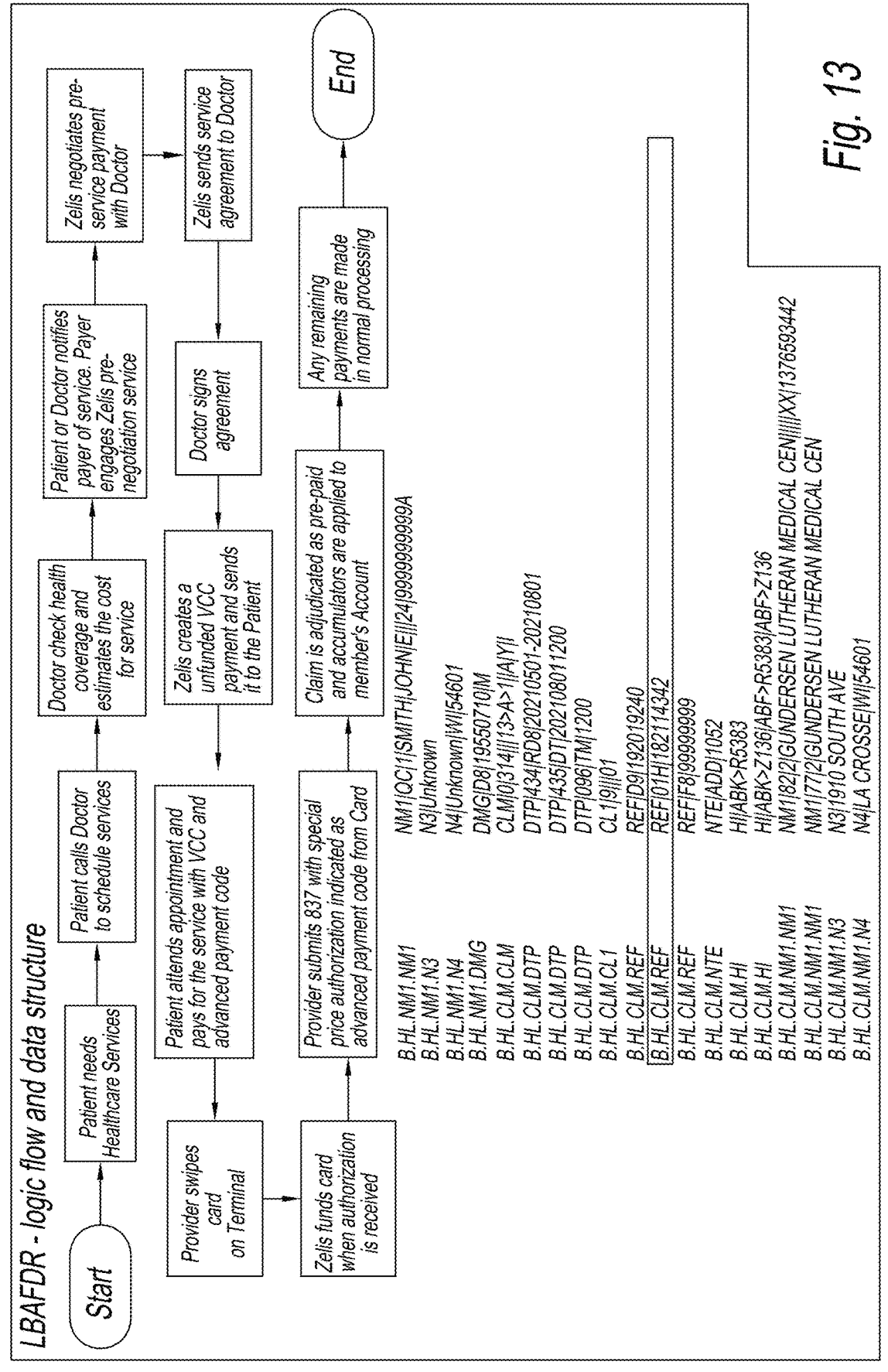
FIG. 13 shows non-limiting, example embodiments of a logic flow illustrating a Fund On Clear component and data structure for the LBAFDR.

FIG. 13 shows non-limiting, example embodiments of a logic flow illustrating a Fund On Clear component and data structure for the LBAFDR.

Additional Alternative Embodiment Examples

The following alternative example embodiments provide a number of variations of some of the already discussed principles for expanded color on the abilities of the LBAFDR.

Additional embodiments may include:

1. A fund-later-delegate router apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions comprising:

import, via the at least one processor, a variable payment datastructure, in which the variable payment datastructure is structured as including any of: a print check image, a virtual payment card, a direct deposit;

create a variable payment datastructure record, in which the variable payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions to debit dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable payment datastructure record based on the obtained funding information datastructure.

2. The apparatus of embodiment 1, in which the target facilitator initiates card authorization and settlement for the dedicated fund-later-delegate variable account when it includes the dedicated fund-later-delegate card account.

3. The apparatus of embodiment 1, in which the fulfillment file card datastructure is populated with completion files obtained from an EML, and further comprising:

providing payment via any of: downloading, faxing, printing.

4. A fund-later-delegate router processor-readable, non-transient medium, the medium storing a component collection, the component collection storage structured with processor-executable instructions comprising:

import, via the at least one processor, a variable payment datastructure, in which the variable payment datastructure is structured as including any of: a print check image, a virtual payment card, a direct deposit;

create a variable payment datastructure record, in which the variable payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions to debit dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable payment datastructure record based on the obtained funding information datastructure.

5. The medium of embodiment 4, in which the target facilitator initiates card authorization and settlement for the dedicated fund-later-delegate variable account when it includes the dedicated fund-later-delegate card account.

6. The medium of embodiment 4, in which the fulfillment file card datastructure is populated with completion files obtained from an EML, and further comprising:

providing payment via any of: downloading, faxing, printing.

7. A fund-later-delegate router processor-implemented system, comprising:

means to store a component collection;

means to process processor-executable instructions from the component collection, the component collection storage structured with processor-executable instructions including:

import, via the at least one processor, a variable payment datastructure, in which the variable payment datastructure is structured as including any of: a print check image, a virtual payment card, a direct deposit;

create a variable payment datastructure record, in which the variable payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions to debit dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable payment datastructure record based on the obtained funding information datastructure.

8. The system of embodiment 7, in which the target facilitator initiates card authorization and settlement for the dedicated fund-later-delegate variable account when it includes the dedicated fund-later-delegate card account.

9. The system of embodiment 7, in which the fulfillment file card datastructure is populated with completion files obtained from an EML, and further comprising:
   providing payment via any of: downloading, faxing, printing.

10. A fund-later-delegate router process, including processing processor-executable instructions via at least one processor from a component collection stored in at least one memory, the component collection storage structured with processor-executable instructions comprising:
    import, via the at least one processor, a variable payment datastructure,
       in which the variable payment datastructure is structured as including any of: a print check image, a virtual payment card, a direct deposit;
    create a variable payment datastructure record,
       in which the variable payment datastructure record is created using a dedicated fund-later-delegate variable account,
          in which the dedicated fund-later-delegate variable account structured as any of: a dedicated fund-later-delegate check disbursement account, a dedicated fund-later-delegate card account, dedicated fund-later-delegate ACH disbursement account;
    provide a payment type information datastructure to a target facilitator,
       in which the payment type information datastructure is any of: a positive payment information datastructure, fulfillment file card datastructure, a ACH instruction datastructure,
          in which the ACH instruction includes instructions to debit dedicated fund-later-delegate ACH disbursement account and credit a member account;
       in which the target facilitator is any of: a bank check clearance server, a card processor server, a ACH bank server;
    obtain funding information datastructure from target facilitator;
    provide credit back to variable payment datastructure record based on the obtained funding information datastructure.

11. The process of embodiment 10, in which the target facilitator initiates card authorization and settlement for the dedicated fund-later-delegate variable account when it includes the dedicated fund-later-delegate card account.

12. The process of embodiment 10, in which the fulfillment file card datastructure is populated with completion files obtained from an EML, and further comprising:
    providing payment via any of: downloading, faxing, printing.

LBAFDR Controller

Figure 14:
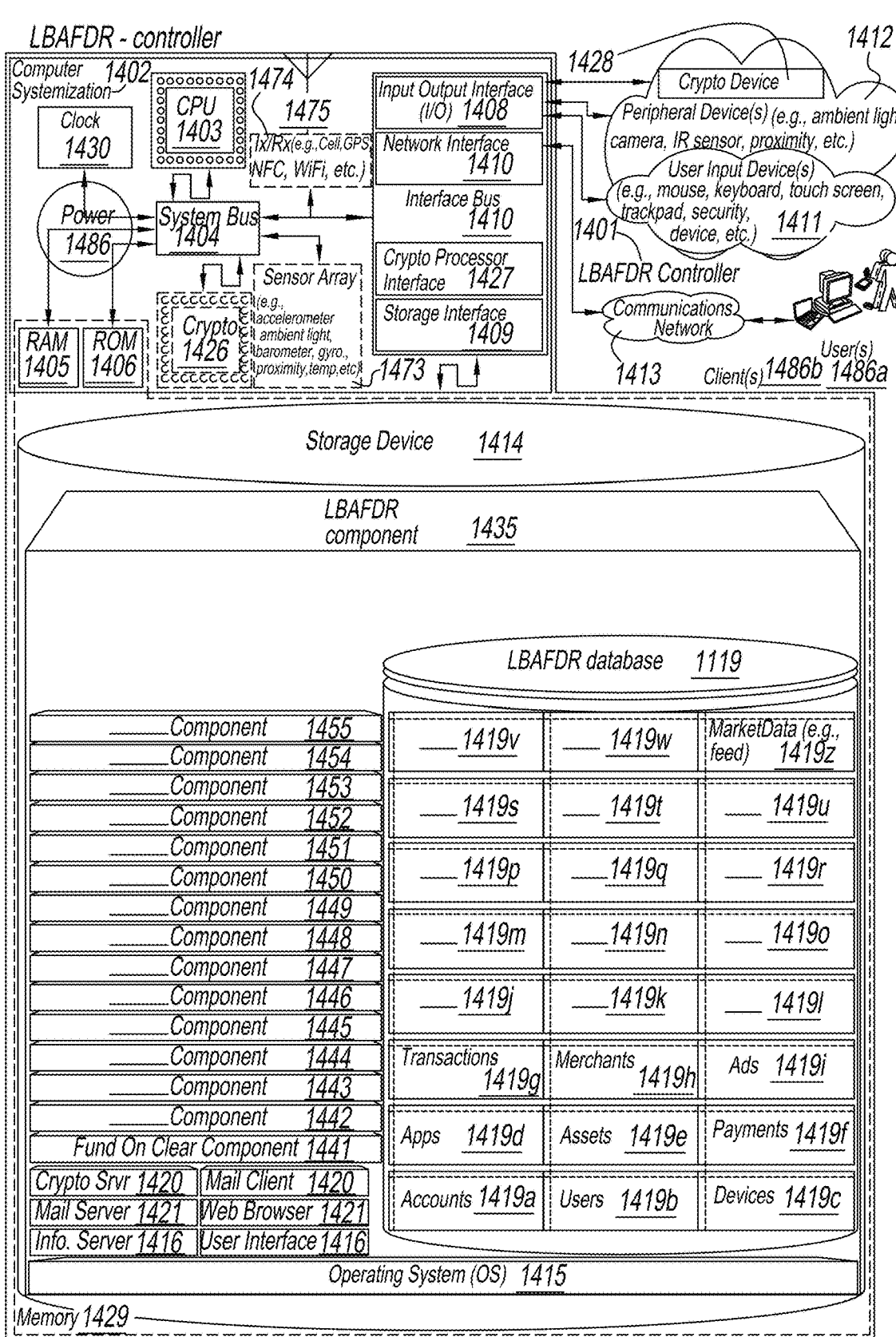
FIG. 14 shows a block diagram illustrating non-limiting, example embodiments of a LBAFDR controller.

FIG. 14 shows a block diagram illustrating non-limiting, example embodiments of a LBAFDR controller. In this embodiment, the LBAFDR controller 1401 may serve to aggregate, process, store, search, serve, identify, instruct, generate, match, and/or facilitate interactions with a computer through electronic payment systems technologies, and/or other related data.

Users, which may be people and/or other systems, may engage information technology systems (e.g., computers) to facilitate information processing. In turn, computers employ processors to process information; such processors 1403 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the LBAFDR controller 1401 may be connected to and/or communicate with entities such as, but not limited to: one or more users from peripheral devices 1412 (e.g., user input devices 1411); an optional cryptographic processor device 1428; and/or a communications network 1413.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The LBAFDR controller 1401 may be based on computer systems that may comprise, but are not limited to, components such as: a computer systemization 1402 connected to memory 1429.

Computer Systemization

A computer systemization 1402 may comprise a clock 1430, central processing unit ("CPU(s)" and/or "processor(s)" (these terms are used interchangeably throughout the disclosure unless noted to the contrary)) 1403, a memory 1429 (e.g., a read only memory (ROM) 1406, a random access memory (RAM) 1405, etc.), and/or an interface bus 1407, and most frequently, although not necessarily, are all interconnected and/or communicating through a system bus 1404 on one or more (mother)board(s) 1402 having conductive and/or otherwise transportive circuit pathways through which instructions (e.g., binary encoded signals) may travel to effectuate communications, operations, storage, etc. The computer systemization may be connected to a power source 1486; e.g., optionally the power source may be internal. Optionally, a cryptographic processor 1426 may be connected to the system bus. In another embodiment, the cryptographic processor, transceivers (e.g., ICs) 1474, and/or sensor array (e.g., accelerometer, altimeter, ambient light, barometer, global positioning system (GPS) (thereby allowing LBAFDR controller to determine its location), gyroscope, magnetometer, pedometer, proximity, ultra-violet sensor, etc.) 1473 may be connected as either internal and/or external peripheral devices 1412 via the interface bus I/O 1408 (not pictured) and/or directly via the interface bus 1407. In turn, the transceivers may be connected to antenna(s) 1475, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves may incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1429 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's@80X86 series (e.g., 80386, 80486), Pentium®, Celeron®, Core (2) Duo®, i series (e.g., i3, i5, i7, i9, etc.), Itanium®, Xeon®, and/or XScale®; Motorola's®680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the LBAFDR controller and beyond through various interfaces. Should processing requirements dictate a greater amount speed and/or capacity, distributed processors (e.g., see Distributed LBAFDR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the LBAFDR may be achieved by implementing a micro-controller such as CAST's® R8051XC2 microcontroller; Intel's® MCS 51 (i.e., 8051 microcontroller); and/or the like. Also, to implement certain features of the LBAFDR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the LBAFDR component collection (distributed or otherwise) and/or features may be implemented via the microprocessor and/or via embedded components; e.g., via ASIC, coprocessor, DSP, FPGA, and/or the like. Alternately, some implementations of the LBAFDR may be implemented with embedded components that are configured and used to achieve a variety of features or signal processing.

Depending on the particular implementation, the embedded components may include software solutions, hardware solutions, and/or some combination of both hardware/software solutions. For example, LBAFDR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the LBAFDR features. A hierarchy of programmable interconnects allow logic blocks to be interconnected as needed by the LBAFDR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the LBAFDR may be developed on FPGAs and then migrated into a fixed version that more resembles ASIC implementations. Alternate or coordinating implementations may migrate LBAFDR controller features to a final ASIC instead of or in addition to FPGAs. Depending on the implementation all of the aforementioned embedded components and microprocessors may be considered the "CPU" and/or "processor" for the LBAFDR.

Power Source

The power source 1486 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1486 is connected to at least one of the interconnected subsequent components of the LBAFDR thereby providing an electric current to all subsequent components. In one example, the power source 1486 is connected to the system bus component 1404. In an alternative embodiment, an outside power source 1486 is provided through a connection across the I/O 1408 interface. For example, Ethernet (with power on Ethernet), IEEE 1394, USB and/or the like connections carry both data and power across the connection and is therefore a suitable source of power.

Interface Adapters

Interface bus(ses) 1407 may accept, connect, and/or communicate to a number of interface adapters, variously although not necessarily in the form of adapter cards, such as but not limited to: input output interfaces (I/O) 1408, storage interfaces 1409, network interfaces 1410, and/or the like. Optionally, cryptographic processor interfaces 1427 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1409 may accept, communicate, and/or connect to a number of storage devices such as, but not limited to: (removable) storage devices 1414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1410 may accept, communicate, and/or connect to a communications network 1413. Through a communications network 1413, the LBAFDR controller is accessible through remote clients 1433b (e.g., computers with web browsers) by users 1433a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed LBAFDR below), architectures may similarly be employed to pool, load balance, and/or otherwise decrease/increase the communicative bandwidth required by the LBAFDR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1410 may be used to engage with various communications network types 1413. For example, multiple network interfaces may be employed to allow for the communication over broadcast, multicast, and/or unicast networks.

Input Output interfaces (I/O) 1408 may accept, communicate, and/or connect to user, peripheral devices 1412 (e.g., input devices 1411), cryptographic processor devices 1428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) display port, high-definition multi-media interface (HDMI), RCA, RF antennae, S-Video, Thunderbolt/USB-C, VGA, and/or the like; wireless trans-ceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1412 may be connected and/or com-municate to I/O and/or other facilities of the like such as network interfaces, storage interfaces, directly to the inter-face bus, system bus, the CPU, and/or the like. Peripheral devices may be external, internal and/or part of the LBAFDR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyro-scopes, proximity, temperature, etc.), storage devices, trans-ceivers (e.g., cellular, GPS, etc.), video devices (e.g., goggles, monitors, etc.), video sources, visors, and/or the like. Peripheral devices often include types of input devices (e.g., cameras).

User input devices 1411 often are a type of peripheral device 512 (see above) and may include: accelerometers, camaras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the LBAFDR control-ler may be embodied as an embedded, dedicated, and/or monitor-less (i.e., headless) device, and access may be provided over a network interface connection.

Cryptographic units such as, but not limited to, micro-controllers, processors 1426, interfaces 1427, and/or devices 1428 may be attached, and/or communicate with the LBAFDR controller. A MC68HC16 microcontroller, manu-factured by Motorola, Inc.®, may be used for and/or within cryptographic units. The MC68HC16 microcontroller uti-lizes a 16-bit multiply-and-accumulate instruction in the 16 MHz configuration and requires less than one second to perform a 512-bit RSA private key operation. Cryptographic units support the authentication of communications from interacting agents, as well as allowing for anonymous trans-actions. Cryptographic units may also be configured as part of the CPU. Equivalent microcontrollers and/or processors may also be used. Other specialized cryptographic proces-sors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughter-card); Via Nano® Processor (e.g., L2100, L2200, U2400) line, which is capable of performing 500+MB/s of crypto-graphic instructions; VLSI Technology's® 33 MHz 6868; and/or the like.

Memory

Generally, any mechanization and/or embodiment allow-ing a processor to affect the storage and/or retrieval of information is regarded as memory 1429. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the LBAFDR controller and/or a com-puter systemization may employ various forms of memory 1429. For example, a computer systemization may be con-figured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1429 may include ROM 1406, RAM 1405, and a storage device 1414. A storage device 1414 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage medi-ums; and/or other devices of the like. Thus, a computer systemization generally employs and makes use of memory.

Component Collection

The memory 1429 may contain a collection of processor-executable application/library/program and/or database components (e.g., including processor-executable instruc-tions) and/or data such as, but not limited to: operating system component(s) 1415 (operating system); information server component(s) 1416 (information server); user inter-face component(s) 1417 (user interface); Web browser com-ponent(s) 1418 (Web browser); database(s) 1419; mail server component(s) 1421; mail client component(s) 1422; cryptographic server component(s) 1420 (cryptographic server); the LBAFDR component(s) 1435 (e.g., which may include post-presentment funding 1441-1455, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1414, they may also be loaded and/or stored in memory such as: cache, peripheral devices, processor registers, RAM, remote storage facilities through a communications network, ROM, various forms of memory, and/or the like.

Operating System

The operating system component 1415 is an executable program component facilitating the operation of the LBAFDR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the LBAFDR controller to communicate with other entities through a communications network 1413. Various communication protocols may be used by the LBAFDR controller as a subcarrier transport mechanism for interaction, such as, but not limited to: multicast, TCP/IP, UDP, unicast, and/or the like.

Information Server

An information server component 1416 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the LBAFDR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the LBAFDR database 1419, operating systems, other program components, user interfaces, Web browsers, and/or the like.

Access to the LBAFDR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the LBAFDR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the LBAFDR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/ Millennium/Mobile/NT/Vista/XP/7/X (Server)@(i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 1417 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1418 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/ or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the LBAFDR enabled nodes. The combined application may be nugatory on systems employing Web browsers.

Mail Server

A mail server component 1421 is a stored program component that is executed by a CPU 1403. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the LBAFDR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the LBAFDR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1422 is a stored program component that is executed by a CPU 1403. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1420 is a stored program component that is executed by a CPU 1403, cryptographic processor 1426, cryptographic processor interface 1427, cryptographic processor device 1428, and/or the like. Cryptographic processor interfaces may allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the LBAFDR may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the LBAFDR component to engage in secure transactions if so desired. The cryptographic component facilitates the secure accessing of resources on the LBAFDR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The LBAFDR Database

The LBAFDR database component 1419 may be embodied in a database and its stored data. The database is a stored program component, which is executed by the CPU; the stored program component portion configuring the CPU to process the stored data. The database may be a fault tolerant, relational, scalable, secure database such as Claris File-Maker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the LBAFDR database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the LBAFDR database is implemented as a data-structure, the use of the LBAFDR database 1419 may be integrated into another component such as the LBAFDR component 1435. Also, the database may be implemented as a mix of data structures, objects, programs, relational structures, scripts, and/or the like. Databases may be consolidated and/or distributed in countless variations (e.g., see Distributed LBAFDR below). Portions of databases, e.g., tables, may be exported and/or imported and thus decentralized and/or integrated.

In one embodiment, the database component 1419 includes several tables representative of the schema, tables, structures, keys, entities and relationships of the described database 1419*a-z*:

An accounts table 1419*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1419*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, first-Name, middleName, lastName, nameSuffix, DateOf-Birth, userAge, userName, userEmail, userSocialAc-countID, contactType, contactRelationship, userPhone, userAddress, userCity, userState, userZIPCode, user-Country, userAuthorizationCode, userAccessPrivilges, userPreferences, userRestrictions, and/or the like (the user table may support and/or track multiple entity accounts on a LBAFDR);

An devices table 1419c includes fields such as, but not limited to: deviceID, sensorIDs, accountID, assetIDs, paymentIDs, deviceType, deviceName, deviceManu-facturer, deviceModel, deviceVersion, deviceSerialNo, deviceIPaddress, deviceMACaddress, device_ECID, deviceUUID, deviceLocation, deviceCertificate, devi-ceOS, appIDs, deviceResources, deviceSession, auth-Key, deviceSecureKey, walletAppInstalledFlag, deviceAccessPrivileges, devicePreferences, deviceR-estrictions, hardware_config, software_config, storage_location, sensor_value, pin_reading, data length, channel_requirement, sensor_name, sensor_model_no, sensor_manufacturer, sensor_type, sen-sor_serial_number, sensor_power_requirement, devi-ce_power_requirement, location, sensor_associated_tool, sensor_dimensions, device_dimensions, sensor_communications_type, device_communications_type, power_percentage, power_condition, temperature_set-ting, speed_adjust, hold_duration, part_actuation, and/or the like. Device table may, in some embodiments, include fields corresponding to one or more Bluetooth profiles, such as those published at https://www.blu-etooth.org/en-us/specification/adopted-specifications, and/or other device specifications, and/or the like;

An apps table 1419d includes fields such as, but not limited to: appID, appName, appType, appDependen-cies, accountID, deviceIDs, transactionID, userID, app-StoreAuthKey, appStoreAccountID, appStoreIPPad-dress, appStoreURLaccessCode, appStorePortNo, appAccessPrivileges, appPreferences, appRestrictions, portNum, access_API_call, linked_wallets_list, and/or the like;

An assets table 1419e includes fields such as, but not limited to: assetID, accountID, userID, distributorAc-countID, distributorPaymentID, distributorOnwerID, assetOwnerID, assetType, assetSourceDeviceID, asset-SourceDeviceType, assetSourceDeviceName, asset-SourceDistributionChannelID, assetSourceDistribu-tionChannelType, assetSourceDistributionChannel-Name, assetTargetChannelID, assetTargetChannel-Type, assetTargetChannelName, assetName, asset-SeriesName, assetSeriesSeason, assetSeriesEpisode, assetCode, assetQuantity, assetCost, assetPrice, assetValue, assetManufactuer, assetModelNo, assetSe-rialNo, assetLocation, assetAddress, assetState, assetZ-IPcode, assetState, assetCountry, assetEmail, assetI-Paddress, assetURLaccessCode, assetOwnerAcco-untID, subscriptionIDs, assetAuthroizationCode, assetAccessPrivileges, assetPreferences, assetRestric-tions, assetAPI, assetAPIconnectionAddress, and/or the like;

A payments table 1419f includes fields such as, but not limited to: paymentID, accountID, userID, couponID, couponValue, couponConditions, couponExpiration, paymentType, paymentAccountNo, paymentAccount-Name, paymentAccountAuthorizationCodes, paymen-tExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLac-cessCode, paymentPortNo, paymentAccessPrivileges, paymentPreferences, payementRestrictions, and/or the like;

An transactions table 1419g includes fields such as, but not limited to: transactionID, accountID, assetIDs, deviceIDs, paymentIDs, transactionIDs, userID, mer-chantID, transactionType, transactionDate, transaction-Time, transactionAmount, transactionQuantity, trans-actionDetails, productsList, productType, productTitle, productsSummary, productParamsList, transactionNo, transactionAccessPrivileges, transactionPreferences, transactionRestrictions, merchantAuthKey, merchant-AuthCode, and/or the like;

An merchants table 1419h includes fields such as, but not limited to: merchantID, merchantTaxID, merchante-Name, merchantContactUserID, accountID, issuerID, acquirerID, merchantEmail, merchantAddress, mer-chantState, merchantZIPcode, merchantCountry, mer-chantAuthKey, merchantIPaddress, portNum, mer-chantURLaccessCode, merchantPortNo, merchant-AccessPrivileges, merchantPreferences, merchant-Restrictions, and/or the like;

An ads table 1419i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTem-plateData, adSourceID, adSourceName, adSource-ServerIP, adSourceURL, adSourceSecurityProtocol, adSourceFTP, adAuthKey, adAccessPrivileges, adPref-erences, adRestrictions, adNetworkXchangeID, adNet-workXchangeName, adNetworkXchangeCost, adNet-workXchangeMetricType (e.g., CPA, CPC, CPM, CTR, etc.), adNetworkXchangeMetricValue, adNet-workXchangeServer, adNetworkXchangePortNumber, publisherID, publisherAddress, publisherURL, pub-lisherTag, publisherIndustry, publisherName, publish-erDescription, siteDomain, siteURL, siteContent, siteTag, siteContext, siteImpression, siteVisits, site-Headline, sitePage, siteAdPrice, sitePlacement, sitePo-sition, bidID, bidExchange, bidOS, bidTarget, bid-Timestamp, bidPrice, bidImpressionID, bidType, bidScore, adType (e.g., mobile, desktop, wearable, largescreen, interstitial, etc.), assetID, merchantID, deviceID, userID, accountID, impressionID, impres-sionOS, impressionTimeStamp, impressionGeo, impressionAction, impressionType, impressionPub-lisherID, impressionPublisherURL, and/or the like;

A market_data table 1419z includes fields such as, but not limited to: market_data_feed_ID, asset_ID, asset_sym-bol, asset_name, spot_price, bid_price, ask_price, and/or the like; in one embodiment, the market data table is populated through a market data feed (e.g., Bloomb-erg's PhatPipe®, Consolidated Quote System® (CQS), Consolidated Tape Association® (CTA), Consolidated Tape System® (CTS), Dun & Bradstreet®, OTC Mon-tage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the LBAFDR database may interact with other database systems. For example, employing a distributed database system, queries and data access by search LBAFDR component may treat the combination of the LBAFDR database, an integrated data security layer database as a single database entity (e.g., see Distributed LBAFDR below).

In one embodiment, user programs may contain various user interface primitives, which may serve to update the LBAFDR. Also, various accounts may require custom database tables depending upon the environments and the types of clients the LBAFDR may need to serve. It should be noted that any unique fields may be designated as a key field throughout. In an alternative embodiment, these tables have been decentralized into their own databases and their respective database controllers (i.e., individual database controllers for each of the above tables). The LBAFDR may also be configured to distribute the databases over several computer systemizations and/or storage devices. Similarly, configurations of the decentralized database controllers may be varied by consolidating and/or distributing the various database components 1419*a-z*. The LBAFDR may be configured to keep track of various settings, inputs, and parameters via database controllers.

The LBAFDR database may communicate to and/or with other components in a component collection, including itself, and/or facilities of the like. Most frequently, the LBAFDR database communicates with the LBAFDR component, other program components, and/or the like. The database may contain, retain, and provide information regarding other nodes and data.

The LBAFDRs

The LBAFDR component 1435 is a stored program component that is executed by a CPU via stored instruction code configured to engage signals across conductive pathways of the CPU and ISICI controller components. In one embodiment, the LBAFDR component incorporates any and/or all combinations of the aspects of the LBAFDR that were discussed in the previous figures. As such, the LBAFDR affects accessing, obtaining and the provision of information, services, transactions, and/or the like across various communications networks. The features and embodiments of the LBAFDR discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., may reduce the capacity and structural infrastructure requirements to support the LBAFDR's features and facilities, and in many cases reduce the costs, energy consumption/requirements, and extend the life of LBAFDR's underlying infrastructure; this has the added benefit of making the LBAFDR more reliable. Similarly, many of the features and mechanisms are designed to be easier for users to use and access, thereby broadening the audience that may enjoy/employ and exploit the feature sets of the LBAFDR; such ease of use also helps to increase the reliability of the LBAFDR. In addition, the feature sets include heightened security as noted via the Cryptographic components 1420, 1426, 1428 and throughout, making access to the features and data more reliable and secure The LBAFDR transforms print check, payment instructions, documents, virtual card import, payment inputs, via LBAFDR components (e.g., post-presentment funding), into ACH instructions, post-presentment funding disbursement outputs.

The LBAFDR component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; scriptaculo.us; Simple Object Access Protocol (SOAP); SWFObject; Yahoo!® User Interface; and/or the like), WebObjects®, and/or the like. In one embodiment, the LBAFDR server employs a cryptographic server to encrypt and decrypt communications. The LBAFDR component may communicate to and/or with other components in a component collection, including itself, and/or facilities of the like. Most frequently, the LBAFDR component communicates with the LBAFDR database, operating systems, other program components, and/or the like. The LBAFDR may contain, communicate, generate, obtain, and/or provide program component, system, user, and/or data communications, requests, and/or responses.

Distributed LBAFDRs

The structure and/or operation of any of the LBAFDR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the LBAFDR controller may depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for LBAFDR controller and/or LBAFDR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration may depend upon the context, environment, and requirements of system deployment.

For example, in some implementations, the LBAFDR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incom-
    ing communication
$sock=socket_create(AF_INET, SOCK_STREAM, 0);
socket_bind($sock, $address, $port) or die('Could not
    bind to address');
socket_listen($sock);
$client=socket_accept($sock);
// read input data from client device in 1024 byte blocks
    until end of message do {
    $input=
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$pass-
    word); // access database server
mysql_select("CLIENT_DB.SQL"); // select database to
    append
mysql_query("INSERT INTO UserTable (transmission)
VALUES ($data)"); // add data to UserTable table in a
    CLIENT database
mysql_close("CLIENT_DB.SQL"); // close connection to
    database
?>
```

Also, the following resources may be used to provide example embodiments regarding SOAP parser implementation:

http://www.xav.com/perl/site/lib/SOAP/Parser.html
http://publib.boulder.ibm.com/inpost-presentment
fundingenter/tivihelp/v2r1/index.jsp?topic=/com.ib-
    m.IBMDI.doc/referenceguide295.htm and other parser implementations:

http://publib.boulder.ibm.com/inpost-presentment
fundingenter/tivihelp/v2r1/index.jsp?topic=/com.ib-
    m.IBMDI.doc/referenceguide259.htm all of which are hereby expressly incorporated by reference.

In order to address various issues and advance the art, the entirety of this application for Late Binding Asset Funding Datastructure and Router Apparatuses, Processes and Systems (including the Cover Page, Tide, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It may be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/ or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a LBAFDR individual and/or enterprise user, database configuration and/or relational model, data type, data transmission and/or network framework, library, syntax structure, and/or the like, various embodiments of the LBAFDR, may be implemented that allow a great deal of flexibility and customization. For example, aspects of the LBAFDR may be adapted for payment systems, asset routing, asset inventory, data storage. While various embodiments and discussions of the LBAFDR have included electronic payment systems, however, it is to be understood that the embodiments described herein may be readily configured and/or customized for a wide variety of other applications and/or implementations.

What is claimed is:

1. A fund-later-delegate router apparatus, comprising:
at least one memory;
a component collection stored in the at least one memory;
any of at least one processor disposed in communication
   with the at least one memory, the at least one processor
   executing processor-executable instructions from the
   component collection, storage of the component collection
   structured with processor-executable instructions comprising:
   import a variable multi-type payment datastructure,
      in which the variable multi-type payment datastructure
         ture is structured as including any of: a print check
         image, a virtual payment card, a direct deposit;
   create a variable multi-type payment datastructure
      record,
      in which the variable multi-type payment datastructure
         ture record is created using a dedicated fund-later-
         delegate variable account,
         in which the dedicated fund-later-delegate variable
            able account structured as any of: a dedicated
            fund-later-delegate check disbursement
            account, a dedicated fund-later-delegate card
            account, dedicated fund-later-delegate ACH
            disbursement account;
   provide a payment type information datastructure to a
      target facilitator,
      in which the payment type information datastructure
         is any of: a positive payment information datastructure,
         structure, fulfillment file card datastructure, a
         ACH instruction datastructure,
         in which the ACH instruction includes instructions
            debiting dedicated fund-later-delegate ACH
            disbursement account and credit a member
            account;
      in which the target facilitator is any of: a bank check
         clearance server, a card processor server, a ACH
         bank server;
   obtain funding information datastructure from target
      facilitator;

provide credit back to variable multi-type payment datastructure record based on the obtained funding information datastructure.

2. The apparatus of claim 1, in which the target facilitator initiates card authorization and settlement for the dedicated fund-later-delegate variable account when it includes the dedicated fund-later-delegate card account.

3. The apparatus of claim 1, in which the fulfillment file card datastructure is populated with completion files obtained from an EML, and further comprising:

providing payment via any of: downloading, faxing, printing.

4. A fund-later-delegate router processor-readable, non-transient medium, the medium storing a component collection, storage the component collection structured with processor-executable instructions comprising:

import a variable multi-type payment datastructure, in which the variable multi-type payment datastructure is structured as including any of: a print check image, a virtual payment card, a direct deposit;

create a variable multi-type payment datastructure record, in which the variable multi-type payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions debiting dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable multi-type payment datastructure record based on the obtained funding information datastructure.

5. The medium of claim 4, in which the target facilitator initiates card authorization and settlement for the dedicated fund-later-delegate variable account when it includes the dedicated fund-later-delegate card account.

6. The medium of claim 4, in which the fulfillment file card datastructure is populated with completion files obtained from an EML, and further comprising:

providing payment via any of: downloading, faxing, printing.

7. A fund-later-delegate router processor-implemented system, comprising:

means to store a component collection;

means to process processor-executable instructions from the component collection, storage of the component collection structured with processor-executable instructions comprising:

import a variable multi-type payment datastructure, in which the variable multi-type payment datastructure is structured as including any of: a print check image, a virtual payment card, a direct deposit;

create a variable multi-type payment datastructure record, in which the variable multi-type payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions debiting dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable multi-type payment datastructure record based on the obtained funding information datastructure.

8. The system of claim 7, in which the target facilitator initiates card authorization and settlement for the dedicated fund-later-delegate variable account when it includes the dedicated fund-later-delegate card account.

9. The system of claim 7, in which the fulfillment file card datastructure is populated with completion files obtained from an EML, and further comprising:

providing payment via any of: downloading, faxing, printing.

10. A fund-later-delegate router process, including processing processor-executable instructions via any of at least one processor from a component collection stored in at least one memory, storage of the component collection structured with processor-executable instructions comprising:

import a variable multi-type payment datastructure, in which the variable multi-type payment datastructure is structured as including any of: a print check image, a virtual payment card, a direct deposit;

create a variable multi-type payment datastructure record, in which the variable multi-type payment datastructure record is created using a dedicated fund-later-delegate variable account, in which the dedicated fund-later-delegate variable account structured as any of: a dedicated fund-later-delegate check disbursement account, a dedicated fund-later-delegate card account, dedicated fund-later-delegate ACH disbursement account;

provide a payment type information datastructure to a target facilitator, in which the payment type information datastructure is any of: a positive payment information datastructure, fulfillment file card datastructure, a ACH instruction datastructure, in which the ACH instruction includes instructions debiting dedicated fund-later-delegate ACH disbursement account and credit a member account;

in which the target facilitator is any of: a bank check clearance server, a card processor server, a ACH bank server;

obtain funding information datastructure from target facilitator;

provide credit back to variable multi-type payment datastructure record based on the obtained funding information datastructure.

11. The process of claim 10, in which the target facilitator initiates card authorization and settlement for the dedicated fund-later-delegate variable account when it includes the dedicated fund-later-delegate card account.

12. The process of claim 10, in which the fulfillment file card datastructure is populated with completion files obtained from an EML, and further comprising:

providing payment via any of: downloading, faxing, printing.

\* \* \* \* \*